United States Patent
Baba

(10) Patent No.: US 7,107,481 B2
(45) Date of Patent: Sep. 12, 2006

(54) SERVER TAKEOVER SYSTEM AND METHOD

(75) Inventor: Tsunehiko Baba, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 616 days.

(21) Appl. No.: 10/315,939

(22) Filed: Dec. 11, 2002

(65) Prior Publication Data

US 2003/0237018 A1 Dec. 25, 2003

(30) Foreign Application Priority Data

Jun. 25, 2002 (JP) ............................. 2002-183809

(51) Int. Cl.
*G06F 11/00* (2006.01)
(52) U.S. Cl. ........................................................ 714/4
(58) Field of Classification Search .................. 714/4, 714/2
See application file for complete search history.

(56) References Cited

U.S. PATENT DOCUMENTS

| | | | |
|---|---|---|---|
| 6,049,825 A | 4/2000 | Yamamoto | |
| 6,246,666 B1 * | 6/2001 | Purcell et al. | 370/221 |
| 6,539,494 B1 * | 3/2003 | Abramson et al. | 714/4 |
| 6,760,859 B1 * | 7/2004 | Kim et al. | 714/4 |
| 6,934,875 B1 * | 8/2005 | Kashyap | 714/4 |

FOREIGN PATENT DOCUMENTS

| | | |
|---|---|---|
| JP | 10-135993 | 10/1996 |
| JP | 11-296396 | 4/1998 |
| JP | 2000-56996 | 8/1998 |
| JP | 2000-322350 | 5/1999 |

* cited by examiner

*Primary Examiner*—Robert Beausoliel
*Assistant Examiner*—Amine Riad
(74) *Attorney, Agent, or Firm*—Reed Smith LLP; Stanley P. Fisher, Esq.; Juan Carlos A. Marquez, Esq.

(57) ABSTRACT

Systems and methods for effectuating transparent transaction processing takeover in a communications system. An active queue computer facilitates the processing of transactions from a first network layer using an internal active queue. One or more stand-by queue computers shadow the processing of the active queue computer by maintaining internal stand-by queues that are continually synchronized with the active queue. Upon detecting that the active queue computers has entered a failure state, a stand-by queue computer takes over the processing of pending transactions, preferably including those that are currently in the active and stand-by queues. The stand-by computer, now in pseudo-active mode, may return active processing to the former active queue computer after rebooting, may request a network address change to takeover active processing on the stand-by queue computer, or may facilitate the transferring of active status to an additional computer.

27 Claims, 13 Drawing Sheets

SERVER TAKEOVER SYSTEM AND METHOD

BACKGROUND OF THE INVENTION

1. Field of the Invention

The present invention generally relates to fault tolerant network systems, and, more specifically, the present invention relates to an active/pseudo-active/stand-by queue computer system in which transparent request processing takeover is enabled in the case of a software and operating system failure in an active queue computer.

2. Description of the Background

As computer networks become more prevalent in everyday life, the number of both business and personal activities that rely on such methods has increased dramatically. Generally speaking, in a typical network environment, there are a plurality of client computers (users) that issue requests to a plurality of application servers (AP servers) that process those requests. The client computers and AP servers are referred to as existing on the client server layer and the AP server layer, respectively, with the interconnection points on the system known as nodes.

Because so many different computers or other equipment are connected to a single network, the system must have a way in which one machine can communicate with another machine in an efficient way. Because a direct communication link from every computer and/or piece of equipment to every other computer would be costly, networks typically allow for some type of shared communication. The most popular type of network communication scheme involves assigning each machine connected to the network a unique address, and then sending information back and forth across the network in discrete units of information (e.g., "packets") that carry the address of both the sending computer ("sender") and the receiving computer ("receiver"). In this way, each machine can identify information that is addressed to it, and respond accordingly. One popular protocol for such a communication procedure is TCP/IP (Transaction Control Protocol/Internet Protocol).

Each machine on the network physically interconnects with the wired or wireless communication medium via a network interface card or "NIC." Every NIC has a machine address (MAC) that is a unique identifier of that machine. TCP/IP packets that travel throughout a network contain not only data but also address information including the IP address (actual or alias) and the MAC address of both the sending and the receiving computers. The NIC browses all of the packets that travel throughout the network searching for packets that contain its own MAC/IP address. If the NIC determines that a packet contains its own address as the destination, the NIC will receive the entire packet. Likewise, if a packet does not include the NIC's address, the packet will generally be ignored by the NIC.

A NIC may also have a "promiscuous mode" in which all packets are received. If the promiscuous mode is set for a NIC, all packets are received by the NIC without determining whether or not the packet includes that NIC's MAC address. This process of receiving all packets is known as "sniffing" all of the packets on the network. This process may useful in the design of fault tolerant systems.

As mentioned above, every TCP/IP packet that travels throughout a system includes the IP address and the MAC address of both the sender and the intended receiver of the packet. These IP and MAC addresses are added by a network driver running on the sending computer with a NIC installed therein. In some fault tolerant systems, the "sending" IP address and MAC address are set by the NIC so as to reflect the IP and MAC addresses of a machine other than that which actually sends the packet. Through this process, the NIC which receives the packet with the "incorrect" IP and MAC address information will not respond to the computer who sent the packet (because it will not have that computer's proper addresses). This process is known as "spoofing" the packets, and any reply to such a spoofed packet will be sent to the spoofed machine. This technique is often used by hackers who do not wish to be identified.

In order to communicate with another machine over a TCP/IP network, a packet sending computer needs to know the IP address and the MAC address of a receiving computer. The method for determining the correspondence between a NIC's MAC address and the IP address is known as Address Resolution Protocol (ARP). To determine a host B's MAC address, host A sends out an ARP request for the hardware address of host B. Host B sees the request on the network and sends an ARP reply containing the hardware address for the interface with the IP address in question. Host A then records the hardware address in its ARP cache for future use in sending TCP/IP packets.

There is also a similar process known as a gratuitous ARP request. A gratuitous ARP is an ARP reply that is sent by a host even when no ARP request is made to that host. A gratuitous ARP reply is typically addressed to the broadcast hardware address so that all hosts on the local area network (LAN) will receive the ARP reply. Upon receipt of the gratuitous ARP reply, all hosts on the network refresh their ARP cache to reflect the gratuitous ARP. Gratuitous ARP is generally used when the relationship between an IP address and a MAC address changes, i.e., when an IP takeover occurs. With the gratuitous ARP, the change can be communicated to all other hosts on the system in an efficient manner, so that future communications reflect the change.

Because these network communication schemes are so complex, it is often difficult to determine whether or not a certain machine or a certain node on the network is not functioning properly. Because a machine may be engaging in many simultaneous communications with different computers, it may also be difficult to track when these errors occur. Additionally, when an error occurs in a network machine, the other machines must either be made aware of this error (failure state), or some background process must be undertaken to correct the error without the knowledge of the other computers on the network. Such a correction procedure is considered "transparent" to the other computers.

The general category of these error correction or mitigation systems is known as fault tolerant processing. One of the main problems to be addressed by fault tolerant processing is the taking over by another computer (either temporarily-or permanently) of the operations of one computer which enters a fault state. Traditionally, this takeover can only occur in either a limited fashion, or with some disruption caused to the users or client computers (i.e., it is not transparent). Some of the more recent fault tolerant systems are now described.

Japanese Patent Publication No. 11-296396 entitled "Widely Applicable System With Changeover Concealing Function" generally describes a fault recovery system including an active system host and a stand-by system host. Each of these hosts has an associated NIC attached thereto, and each of the hosts is also attached to the NIC of the other system host (active host to stand-by NIC and stand-by host to active NIC). If a system failure occurs in the active system, the stand-by system host will use the NIC of the active system host (via the direct connection), and then MAC address and IP takeover may be achieved.

This system is undesirable to implement because it requires the use of additional hardware (the host/NIC interconnections). Additionally, if the failure error occurs on the active host NIC, rather than on the active host itself, this system is unable to perform the requisite MAC address takeover. Finally, this system is limited in that only MAC address takeover occurs. Any transactions that are being processed during the time when the active host system enters failure mode will be lost, and cannot be recovered to be executed by the stand-by host.

U.S. Pat. No. 6,049,825 entitled "Method and System for Switching Between Duplicated Network Interface Adapters for Host Computer Communications" generally describes a method for switching between duplicated network adapters to provide some level of fault tolerance. This system uses a gratuitous ARP to enable NIC takeover upon detection of a fault.

This type of gratuitous ARP method is not preferred because it is not transparent to the client. In others words, the client computers are aware of the fault. Additionally, because the NIC takeover occurs because of the gratuitous ARP process, the takeover takes an undesirable amount of time for completion. Finally, in a similar problem to that discussed in the above case, this system only provides for NIC takeover, and any transaction that is currently being processed during the time of the fault's occurrence will be lost and must be re-sent by the client.

Japanese Patent Publication No. 2000-056996 entitled "Decentralized Queue System" generally describes a method in which a plurality of queues, that are communicatively connected to each other, are interspersed between several client computers and several application servers. A client request is en-queued in a first queue, and the request is then additionally en-queued into a second queue before the client sends out a second request to the queues. If a fault occurs in the first queue during processing of the request, the second queue is capable of sending the request to the application servers for processing (as well as potentially copying the request to yet another queue in case of a fault in the second queue).

Initially, this method is not satisfactory for communications systems that rely on the speed of data travel because of the large amount of overhead involved in passing every request to more than one queue. Also, although this method somewhat lessens the chance of losing a request, it does not accomplish an IP takeover procedure. Finally, once a queue fails, the connection between the queue system and the server is lost, and the clients must be made aware of the error to re-route future packets—all of which creates even more overhead.

Japanese Patent Publication No. 10-135993 entitled "Address-Setting System in Duplicate System" generally provides a system capable of performing MAC address and IP address takeover. The system includes an address buffer that stores a plurality of MAC addresses. If a system failure occurs, a stand-by computer performs an IP takeover using an alias IP address and MAC takeover using this address buffer. A system rebooting process for the originally active computer (now in stand-by) can test if the network environment is functioning normally by using the original IP address and MAC address.

Although this system is capable of performing MAC address and IP address takeover, it is not capable of addressing any of the requests that are currently being processed by the host when a failure occurs. Again, these requests are lost unless and until they are resent by the client. Also, the above MAC address and IP address processes are not efficient—these takeover processes take an extended period of time to perform.

Japanese Patent Publication No. 2000-322350 entitled "Server Switching System For Client Server System" generally describes a system for rerouting requests to bypass servers that have encountered a failure. The system includes a switching mechanism inserted between a client and a plurality of application servers. All requests from the client to the application servers pass through this switching mechanism so that, if a failure occurs in one of the application servers, the switching mechanism will reroute the request to a substitute server. This rerouting is transparent to the client.

Initially, this system is not preferred because it necessitates an additional layer of hardware in the network system. Also, this system only conceals errors that occur in the application servers—errors that are "below" the switching mechanism. Therefore, errors that occur in the switching mechanism or "above" the switching mechanism are not addressed by this system and are not transparent to the client. Finally, this system does not address requests that are currently being processed in the application server at the time when the server encounters a fault state.

In all, these conventional systems do not provide a transparent and efficient solution to the problem of temporary or permanent IP and MAC address takeover when a failure occurs in an active computer. The ability to both transparently switch processing from one computer to another, as well as to perform this operation without losing any of the requests or transactions that have been queued but not sent out of the active computer at the time of failure is desired. The present invention preferably addresses at least some of the above problems with the conventional systems.

SUMMARY OF THE INVENTION

In at least one preferred embodiment, the present invention provides systems and methods for transparently switching the processing of network transaction requests from an active computer to a stand-by computer when the active computer enters a failure state. The takeover may be a pseudo-takeover procedure in which the stand-by computer temporarily spoofs packets on behalf of the active computer until the active computer returns to normal operation, or the takeover procedure may be permanent (full takeover) in that either the stand-by computer or an additional computer will takeover the formerly active computer's IP and MAC address and become the new active computer.

The system is generally comprised of an active and a stand-by queue computer that are communicatively linked to each other via a shared disk, direct communications connection, or other medium. The active computer includes an active queue that holds all of the transactions that are sent from and to the client network layer (also referred to herein as the "upper layer" or "outside") to and from the AP server layer. Likewise, the stand-by computer includes a stand-by queue that is constantly synchronized with this active queue. If the active computer enters a failure state, the stand-by computer therefore includes a stand-by queue that is preferably identical to the active queue before failure, enabling the stand-by computer to takeover the functions of the active computer.

The stand-by computer preferably also includes a transaction or packet sniffing device ("sniffer") attached to each NIC that monitors packets traveling along each node of the network to which the active and stand-by computers are connected. By receiving network identification information (e.g., IP address, MAC address, sequence number, cryptographic key, etc.) from the active computer, the stand-by computer is thereby able to determine which transactions or packets are sent to the active computer, and which packets are sent out from the active computer. These packets are captured by the stand-by computer and are either en-queued in the stand-by queue or cause a previously en-queued packet to be de-queued from the stand-by queue.

The stand-by computer also preferably includes a packet spoofing device that enables the stand-by computer to send out packets on behalf of the active computer when the stand-by computer enters pseudo-active mode (because of a failure in the active computer). These spoofed packets include packet source address information related to the active computer rather than the stand-by (pseudo-active) computer. Each of the spoofed packets sent out by the pseudo-active computer, therefore, appears to the destination computer to have been sent by the active computer. In this way, the stand-by computer engages in a pseudo-takeover operation.

The stand-by computer may also facilitate a full IP and MAC address takeover operation. When a failure occurs in the active computer, the stand by computer will enter pseudo-active mode and temporarily continue to sniff and spoof packets while it requests the IP and MAC address of the failed active computer. Once these addresses are reassigned to the stand-by computer, the stand-by computer becomes the "new" active computer. In much the same way, the stand-by computer may facilitate an additional computer in becoming the new active computer. Preferably, this (and other) additional computers are also in a stand-by state with a queue that is synchronized with the active computer.

Additionally, other components of the system may also aid in various takeover operations. For example, one or more AP servers (or other machines on the AP server layer) may also be connected in an active/stand-by configuration to enable a takeover of the AP server processing functionality of an "active" AP server that enters a failure state by a "stand-by" AP server. All of these takeover procedures are preferably transparent to the upper level client network layers. Many permutations of these themes are possible.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

The present invention preferably provides a queue computer takeover system that transparently compensates for a failure which occurs in an active queue computer. The following exemplary embodiments are described with respect to a queue computer system that exists between an upper client network layer and a lower AP server network layer, however, the present invention could be expanded within its scope to cover interaction between any two network layers.

Further, for ease of discussion-, several notational conventions are generally used. First, transactions or requests that begin at the client layer and are sent to the AP layer are collectively referred to as "INPUT" transactions. Likewise, transactions that begin at the AP layer and are sent to the client layer are collectively referred to as "OUTPUT" transactions. Generally, a client sends an INPUT transaction to an AP server in order to effectuate some type of processing, and the returned result is a corresponding OUTPUT transaction from the AP server back to the client.

Additionally, during several of the steps in a process according to the present invention, a computer sends a transaction to another computer, and then engages in some action based on that sending of the transaction (e.g., the active computer sending an OUTPUT transaction to the client and then de-queuing the corresponding INPUT transaction). Even though it is not always specifically stated, the action taken does not typically take place until after an acknowledgement of receipt of the sent transaction is received by the source of the transaction. In other words, the communication of the transaction is complete according to standard networking practices. If the acknowledgement is not received (or other networking convention is not satisfied), then the transaction is generally considered by the present system to have not yet been sent.

Figure 1:
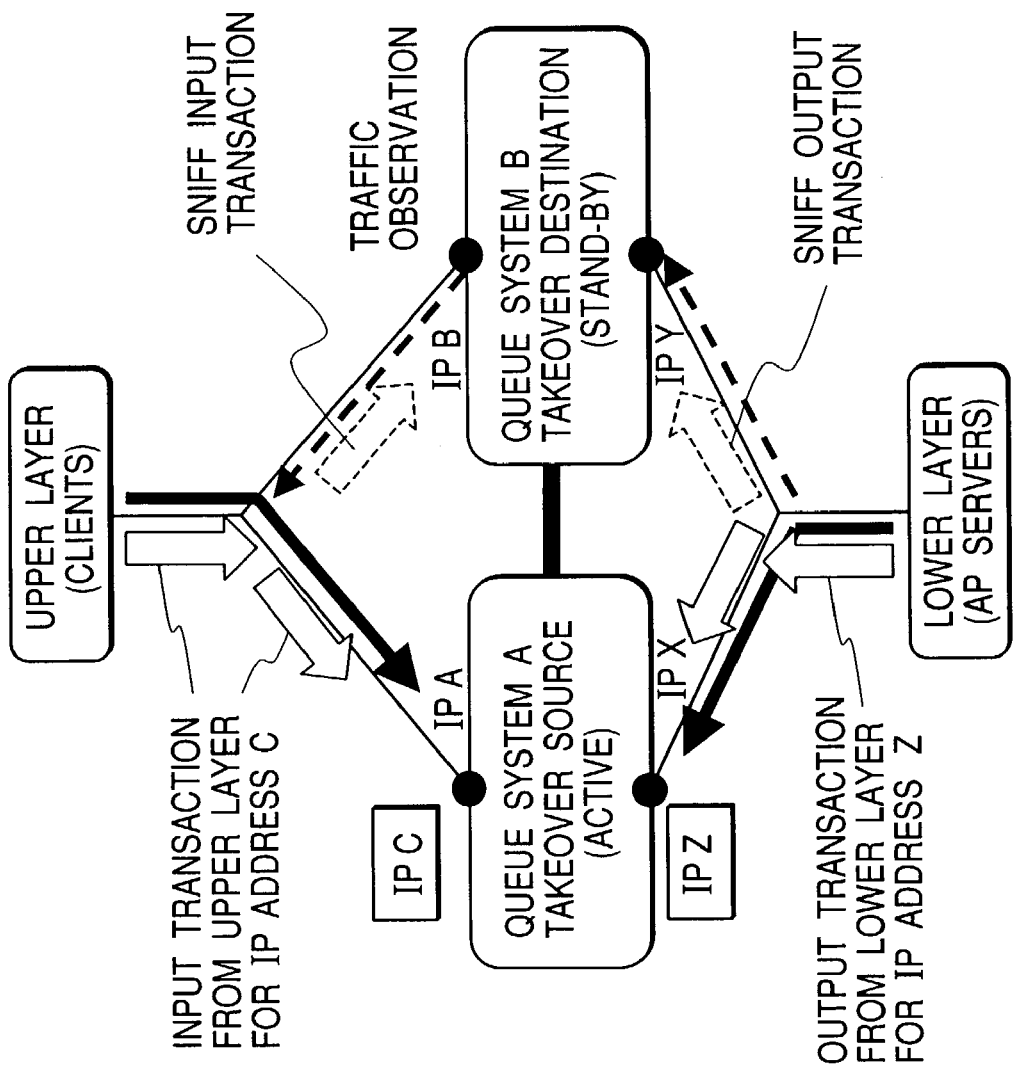
FIG. 1 shows a high level system block diagram of an active/stand-by queue system model according to the present invention.

FIG. 1 shows a high level system block diagram of an active/stand-by system model according to a preferred embodiment of the present invention. The FIG. 1 system is generally comprised of three network layers: (1) the upper client layer (or "outside") which includes a plurality of client computers; the lower application layer which includes the application servers ("AP servers"); and the middle queue computer layer which tracks the completion of INPUT transactions made by the clients to the AP servers and the OUTPUT transactions sent by the AP servers to the clients in response thereto (i.e., transaction management). The queue layer acts as a buffer between the clients and the AP servers and performs the fault tolerant processing according to at least one embodiment of the present invention.

In FIG. 1, the queue computer layer comprises an active queue system A (or "takeover source" or "active" computer) and a stand-by queue system B (or "takeover destination" or "stand-by" computer). To facilitate communications between the upper client layer and the lower AP server layer, each queue computer includes a NIC attached to each of these layers. The active and stand-by computers are then further connected to each other via some type of communications medium such as a shared disk or direct communications cable connection.

During normal network operation (i.e., the active computer has not yet failed), a client makes a request to an AP server by sending an INPUT transaction from the upper layer to the client-side NIC on the active queue computer by addressing the transaction with real IP address A and/or the alias IP address C of the active queue computer. The active computer en-queues the INPUT transaction and sends it onto the destination AP server in the AP server layer. After processing the requested functionality in response to the received INPUT transaction, the AP server then preferably sends a reply to the client by sending a corresponding OUTPUT transaction from the AP server layer to the active computer addressed with real IP address X and/or alias IP address Z. This OUTPUT transaction is then sent up to the client layer to be received by the intended destination client computer. The active queue computer matches the sent OUTPUT transaction to the originally received INPUT transaction, and de-queues both transactions from the active queue. This de-queuing process indicates that the INPUT transaction has been properly answered with a properly delivered OUTPUT transaction from the AP server.

It should be noted here that there are actually various schemes by which the en-queuing and de-queuing may take place (as described more fully below). However, for the most comprehensive system, the INPUT transactions from the client computers are preferably queued by the active computer as soon as they are first received, and these queued INPUT transactions are preferably not de-queued until some type of delivery receipt confirmation of the OUTPUT transaction is received back from the client computer. For example, this acknowledgement may be a traditional "ACK" signal which is typically received from a destination computer once a transaction has been properly received in networked environments.

At the same time that the above active computer communication takes place, the stand-by computer observes all of the transaction traffic on the network. Using a sniffing procedure as generally described above, the stand-by computer sniffs all of the packets on both the client and AP server layers of the network. When the stand-by computer recognizes INPUT transactions sent by a client to the active computer (real IP address A or alias IP address C) or OUTPUT transactions from an AP server to the active computer (real IP address X or alias IP address Z), the stand-by computer will en-queue and de-queue these transactions from a stand-by queue in a way similar to the active computer. The ability for the stand-by computer to takeover for the active computer when the active computer fails may further be enabled if the stand-by computer also sniffs the transactions sent out by the active computer to both the client (OUTPUT) and AP server (INPUT) layers. This additional functionality will be described below.

The queue computer system also includes additional data transfer between the active and the stand-by queue computers. This communication may take place by some direct communication cable, by a shared disk, or any other means of sharing information between the two systems. A first type of information shared between the two queue computers maintains transaction queue consistency between the active queue and the stand-by queue. For example, as the active computer en-queues and de-queues request transactions as they are sent to and from the AP servers and the client computers for processing, the queue in the stand by computer is updated to reflect this change. The stand-by computer preferably maintains the same queue information as the active computer so that, in the event of a failure in the active computer, the stand-by queue system is able to facilitate the processing of the en-queued INPUT transactions that have not been replied to by the AP server layer (with a corresponding OUTPUT transaction). Without synchronization of the queues, some requests may be lost if a failure occurs in the active computer.

The active and stand-by computers also preferably share AP status update information. In this way, any change in the status of the one or more servers in the AP layer will be known to each of the queue computers so that each of the queue computers will transfer requests in the same way. Also, there is preferably system monitoring information that is sent between the active and the stand-by computers. In this way, the stand-by queue computer may continually monitor the active queue computer to determine precisely when (and if) a fault occurs in the active computer. When a fault is detected, the stand-by computer may attempt to address the fault in a number of ways, including eventually causing a system level reboot of the active computer while the stand-by computer facilitates the processing of the en-queued but as yet unprocessed INPUT transactions.

Figure 2:
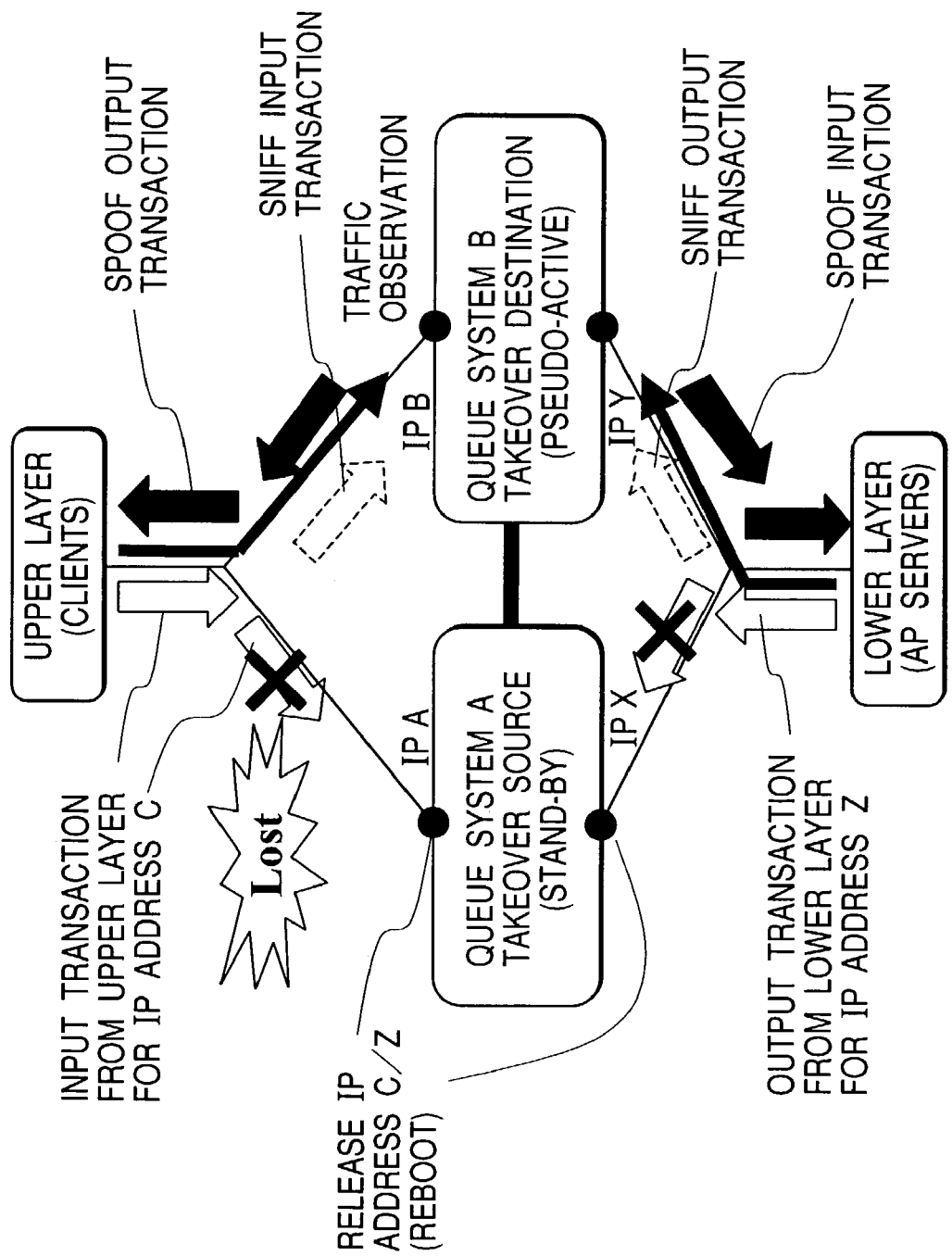
FIG. 2 shows a high level system block diagram of an active/stand-by queue system model in which a failure has occurred in the takeover source computer.

FIG. 2 shows a high level system block diagram according to the present invention in which a failure has occurred in the active computer. To facilitate a better understanding of the takeover process, the active computer will be referred to as the takeover source and the stand-by computer as the takeover destination in this portion of the description. In FIG. 2, a client sends an INPUT transaction from the upper layer to alias IP address C, but the request does not arrive at the intended AP server. Some error has occurred in the takeover source computer. However, this INPUT transaction has also been sniffed by the takeover destination computer, and has been stored in the stand by queue within the takeover destination computer.

Because of the system monitoring function that occurs between the takeover source and the takeover destination computers, the takeover destination computer preferably becomes aware that the takeover source computer is not functioning properly within a short period of time. Initially, the destination takeover computer sends a request to the takeover source computer to release the alias IP addresses (C, Z). If no immediate response to this request is received by the takeover destination computer from the takeover source, the takeover destination computer preferably sends a hardware reset (force-reset) command to the takeover source computer to force the takeover source computer to reboot (to correct the error).

The takeover destination computer then has at least two modes in which it may enter: pseudo-active or active. In pseudo-active mode, the takeover destination computer will aid in the processing of the INPUT transactions that have been received from the client layer (and en-queued) but have not been replied to by the AP server layer via a corresponding OUTPUT transaction. The takeover destination computer preferably accomplishes this by sending packets on behalf of the takeover source computer by altering the sender source IP address and MAC address in outgoing packets so that each of the packets appears to emanate from the (now rebooting) takeover source computer. In this way, the receiver of these packets will determine that the packet is being sent from the takeover source computer, and the failure of the takeover source will be transparent to the other computers (client and AP server) on the system. This intentional address change is known as "spoofing" the packets.

The takeover destination computer also continues to sniff all packets on the system and save those that are destined for the (now rebooting) takeover source computer. These sniffed packets are en-queued, and the takeover destination computer will, in effect, perform the same actions as the takeover source computer without actually taking over the source computer's IP address or MAC address. Once the takeover source computer has been successfully rebooted and regained control of IP addresses C, Z, the takeover destination computer will preferably send the remaining queue information (which has changed since the failure occurred in the source computer) back to the takeover source computer. The takeover destination computer will then cease spoofing packets on behalf of the source computer and will re-enter the stand-by state.

Alternatively, the takeover destination computer may enter the active mode and actually takeover the IP and MAC addresses of the takeover source computer. For example, when the takeover destination computer determines that an error has occurred in the source computer and forces the source computer to release its IP and MAC addresses and reboot, the takeover destination computer preferably enters the pseudo-active mode and begins to spoof transactions on behalf of the takeover source computer. However, rather than wait for the takeover source computer to reboot and re-enter the active mode, the takeover destination computer requests from the system the use of the IP address (real and/or alias) and the MAC address that formerly belonged to the takeover source. When the takeover destination computer receives the IP address and MAC address that were formerly used by the source computer, the destination computer enters the active mode and proceeds to process the requests in its queue (which becomes the active queue). In effect, the takeover destination computer completely replaces the takeover source computer in a way such that the takeover is transparent to the other system users (clients and AP servers).

Once the (formerly active) takeover source computer has been rebooted, the (now active) takeover destination computer will preferably send the request queue over to the source computer, and the source computer will now enter the stand-by mode. In this way, the takeover source and destination computers have essentially switched places in the system. Now, the former source computer will sniff packets and wait for an error to occur in the presently active queue computer. If an error occurs, the same process as just described above will take place again—only with the roles of the two computers reversed.

A third option for the takeover destination computer involves the use of an additional computer. In this way, after the takeover destination computer enters pseudo-active mode and begins to spoof transactions on behalf of the takeover source computer, the takeover destination computer may facilitate a full takeover (to the active state) by a third or additional computer. This additional computer preferably receives the use of the IP and MAC address of the takeover source computer and enters the active state. The takeover destination computer may then enter stand-by mode and wait for an error to occur in the new active computer. The (formerly active) takeover source computer may likewise enter the stand-by mode as described above. There is no limit to the number of queue computers that may be used as stand-by computers.

Figure 3:
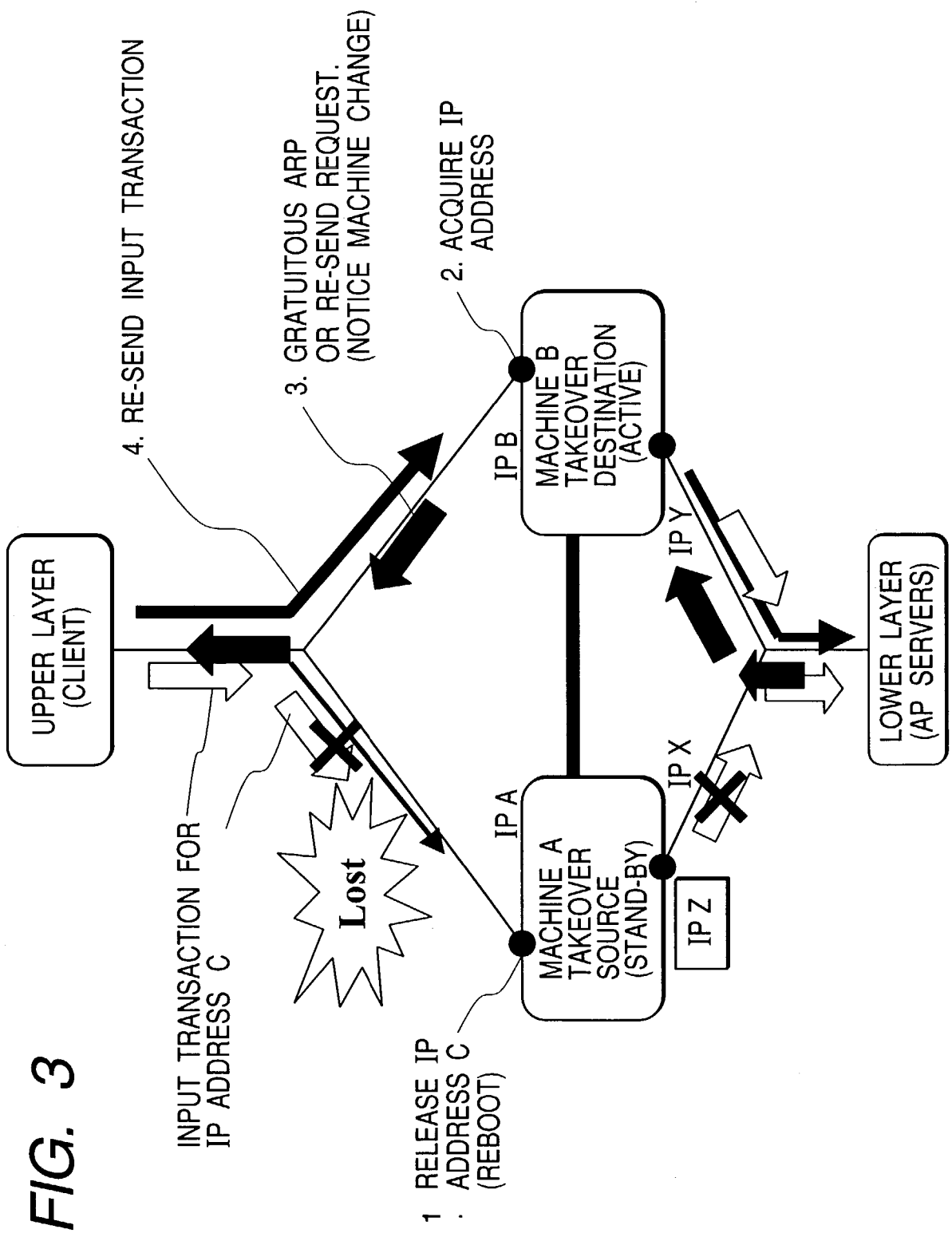
FIG. 3 shows a high level block diagram of a conventional failure takeover system using active and stand-by queue computers.

To better understand the limitations of conventional methods, FIG. 3 shows a high level block diagram of a conventional failure takeover system using active and stand-by queue computers. In the FIG. 3 system, when an error is detected in the takeover source computer, the takeover destination computer makes a request to acquire, and then eventually acquires the IP address C of the takeover source computer. The takeover destination then sends a gratuitous ARP and/or requests to the client to re-send request transactions because the MAC address for the new active computer does not match those of the original active computer, even though the IP addresses are the same. The client computer will preferably re-send the original request transaction after either the original request transaction has timed-out or upon receipt of the gratuitous ARP. Obviously, the client computer is now aware that the error has occurred in the takeover source computer, and the client computer must take additional steps (i.e., re-sending transaction, updating ARP cache) to help cure the problem caused by this error. This failure takeover system is not transparent to the client computer, and is therefore not preferred.

Figure 4:
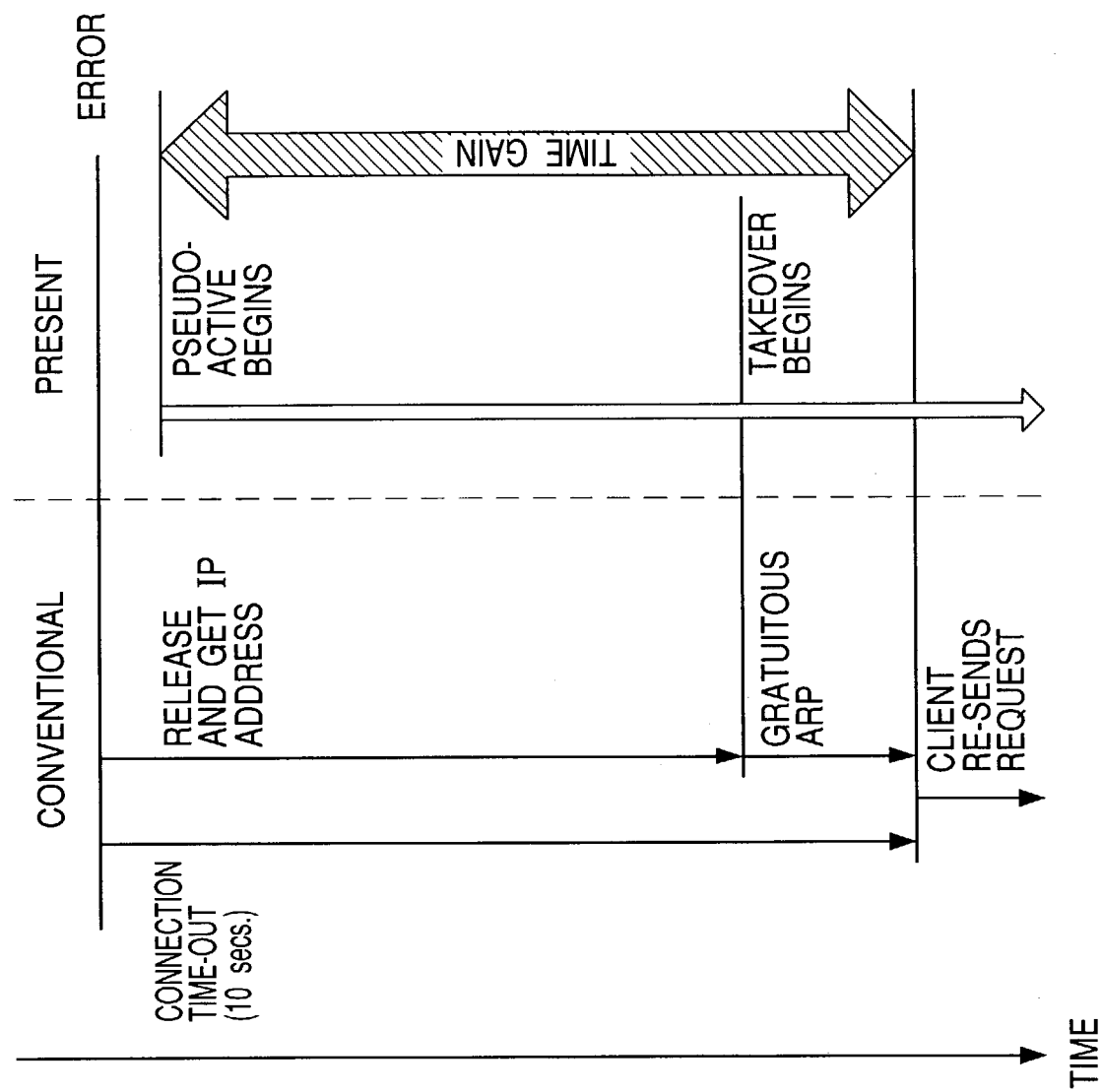
FIG. 4 shows a timing diagram comparing a conventional failure takeover system to the present invention.

FIG. 4 shows a general timing diagram comparing at least one embodiment of the present invention with a conventional failure takeover system. The chart is chronological from top to bottom beginning with an error occurring in the takeover source computer. On the left half of FIG. 4, a conventional method determines that an error occurred in the takeover source computer in one of two ways: either by waiting a predetermined time period ("connection time-out") without receiving a response to a sent INPUT transaction or by asking for a release and reacquisition of an active computer IP address. To notify client computers of the new MAC addresses, the stand-by computer sends out a gratuitous ARP to the clients so that the clients can update their MAC address cache. Once updated, the client needs to re-send those requests that were lost due to the failure in the system, and this whole IP and MAC address change is known by the upper client layer (not transparent).

The right half of FIG. 4 shows the timing for an exemplary embodiment of the present invention. Because the status of the takeover source computer is constantly being monitored by the takeover destination computer, the destination computer may recognize the failure much faster than the conventional gratuitous ARP system. At this time, the destination computers enters pseudo-active mode and, while continuing to sniff and en-queue relevant requests on the system, will also prepare and spoof requests that were previously stored in the takeover destination source computer. The pseudo-active mode may continue until the active computer is rebooted, or, if desired, the destination computer can also request the IP address and MAC address of the source computer that failed and enter active mode at some point in the future. If full takeover is not preferred, the takeover destination computer can relinquish control back to the source computer (after rebooting) so that the source computer is again in active mode and the destination computer is again in stand-by mode.

Either way, during pseudo-active mode, the takeover destination computer is processing INPUT and OUTPUT transactions. In the conventional method, this processing does not occur until the client computers re-send the previous INPUT transactions. Therefore, the "time gain" arrow depicts the time savings in using the present invention as compared to the conventional method. In effect, the present method avoids the error as soon as pseudo-active processing commences whereas it takes until the clients re-send their initial request after acknowledgement of the gratuitous ARP in the conventional method.

Figure 5:
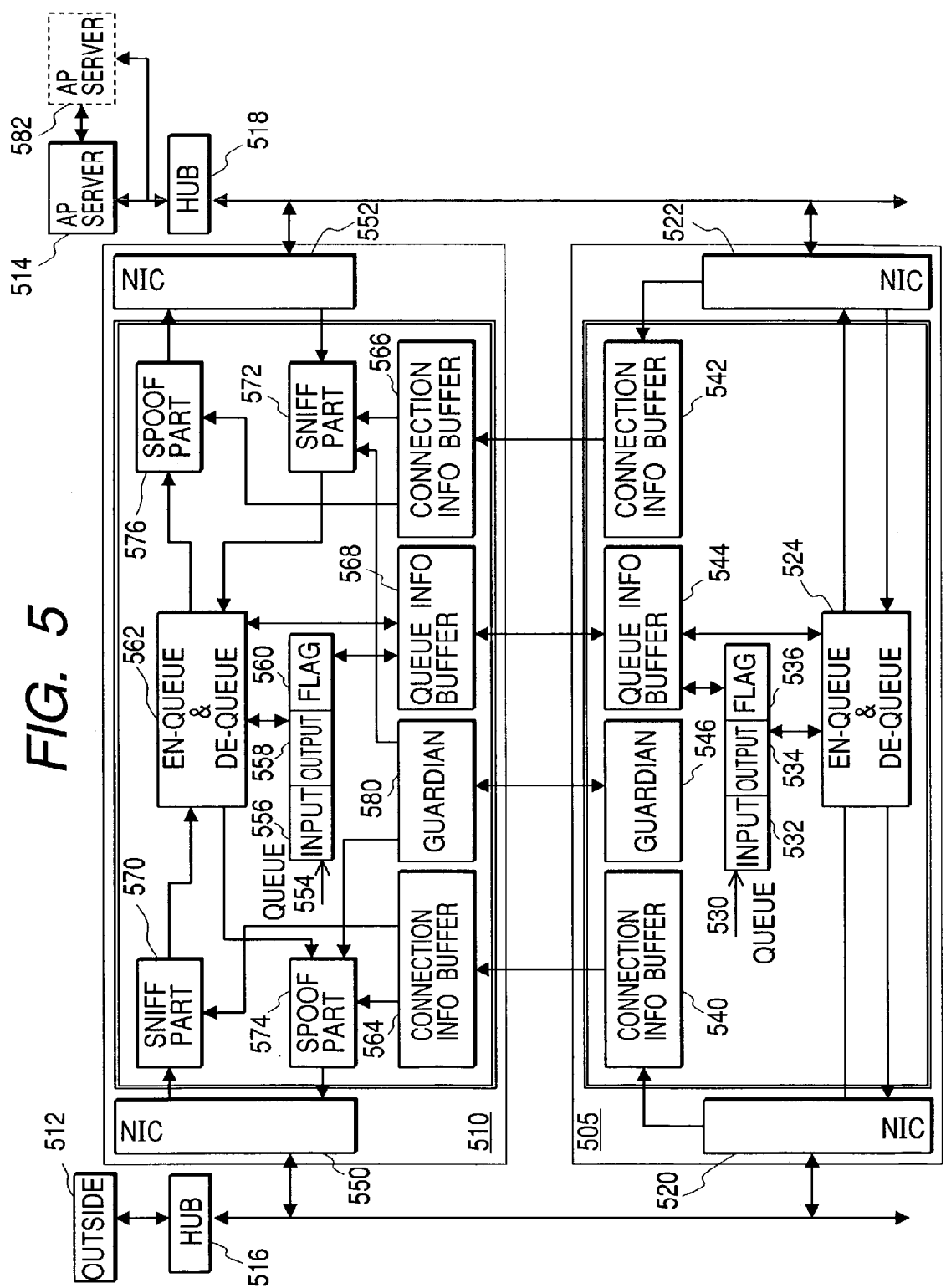
FIG. 5 shows a lower level block diagram of a queue computer system according to the present invention.

FIG. 5 shows a lower level block diagram of the present invention. The components of this block diagram will initially be introduced, and then a description of the various embodiments of the present invention will be provided with reference to the drawing. Additional embodiments and features of the invention will then be provided with reference to various process flow charts.

FIG. 5 generally depicts a system block diagram of both the takeover source 505 and the takeover destination 510 computers of the present invention. Both the takeover source 505 and the takeover destination 510 computers are connected to both the upper client network layer (outside) 512 and the lower AP server layer 514 through HUBs 516, 518, respectively. To access these network layers, the source 505 and destination 510 computers include two NICs each. A first NIC in each computer is connected to the upper layer (520, 550), and a second NIC is connected to the lower layer (522, 552).

The takeover source computer 505 is the active queue computer during initial or normal queue operation. The client-side NIC card 520 receives INPUT transactions from the upper network layer 512 intended for the AP servers 514. Likewise, corresponding OUTPUT transactions from the lower AP server layer are intended to be sent back to the client in response to these INPUT transactions. The two source computer NICs 520, 522 receive and accept packets that are properly addressed (both IP and MAC address) for the given NIC.

Each of these NICs 520, 522 are connected to a connection information buffer 540, 542 that stores information that is needed by the active computer 505 to make legal transactions to the upper client layer 512 or lower AP server layer 514. This active buffer information may include the NIC's real and/or alias IP addresses, MAC address, port number, sequence number and similar information. This information is generally extracted from the NIC and from the operating system running on the active computer 505. To enable sniffing and spoofing by the stand-by computer 510, each of these connection information buffers 540, 542 is connected to a similar buffer 564, 566 located on the stand-by (takeover destination) computer, which will be described below.

The active computer 505 also includes a guardian module 546 that is responsible for enabling the stand-by computer 510 to determine whether the active computer 505 has entered an error or fault state. Preferably, the active guardian 546 will periodically send a signal to the stand-by guardian 580 on the stand-by computer that indicates that active computer operation is progressing normally. When an error occurs, the active computer 505 will cease to send this "OK" signal to the stand-by computer 510, and the stand-by computer will therefore determine that the active computer has encountered a fault. The guardian 546 also preferably includes a hardware reset function for the active computer that enables the stand-by computer to issue a hardware reset command to the active computer (thereby rebooting the active machine) when the active computer is in a fault state.

The active computer 505 also includes an en-queue/de-queue module 524 (which may be separate or combined) connected to an internal active queue 530 that stores all of the INPUT transactions that have been received from the upper client layer 512 and have yet to receive a reply from the lower AP server layer 514 via an OUTPUT transaction. More specifically, the active queue 530 preferably includes three main components: an input queue 532 which holds the en-queued INPUT transactions from the client; an output queue 534 that temporarily holds OUTPUT transactions received from the AP servers 514 that have not yet been sent up the client layer 512; and an input flag queue 536 which keeps track of received INPUT transactions that have also been sent to the AP layer. The queue 530 may be a conventional memory structure, a pipeline, a series of latches or flip/flops, a disk, or any other structure capable of storing electronic information.

In summary, the active queue 530 proceeds as follows: (1) a received INPUT transaction is en-queued into the input queue 532; (2) the received INPUT transaction is sent out to the AP layer 514 and a flag is set in the input flag queue 536 indicating that the INPUT transaction was successfully sent out; (3) an OUTPUT transaction sent by the AP computer 514 in response to the received INPUT transaction is received and stored by the active computer 505 in the output queue portion 534 of the active queue 530; and the active computer sends the received OUTPUT transaction to the appropriate client computer and de-queues the input/output/flag queue entries which correspond to this INPUT/OUTPUT transaction pair.

Information about the en-queuing and de-queuing of transactions, as well as the queued transactions themselves are also sent to the active queue information buffer 544 to be copied and transferred to the stand-by computer 510. This enables the internal queues in both the active and stand-by computers to be synchronized with each other (hold the same data) at all times. If a synchronization error occurs, the queue information buffer 544 is primarily responsible for updating the information in the stand-by computer so that the active 530 and stand-by 554 queues are indeed synchronized. More on the use and interactions of the queues 530, 554 will be described below.

The internal structure of the stand-by queue computer 510 is similar to that of the active computer 505, with the addition of certain sniffing, spoofing, and takeover functionality. Initially, the stand-by computer 510 also includes a NIC card 550 connected to the upper client layer of the network and a NIC card 552 connected to the lower AP server layer of the network. Preferably, these network cards 550, 552 are put into promiscuous mode so that all packets that appear on the network are received by one of these two NICs. Each NIC 550, 552 is also connected to a sniffer module 570, 572 that is connected to both the NIC and the connection information buffers 564, 566. The connection information buffer 564, 566, as briefly described above, is constantly updated with information about the active computer 505 that is necessary to send legal packets on behalf of the active computer. The connection information buffers transfer all kinds of information between each other. Some of this information is static in nature and can be transferred during an initial boot process, but other information is dynamically updated during system operation, and the-connection buffers must continually pass this information between each other so that the active and stand-by computers are synchronized with respect to packet communication.

The sniffer module 570 at the client side of the standby computer 510 uses the information in the connection information buffer 564 to filter all of the packets received by the NIC 550 to determine which packets belong to the active computer, which packets belong to the stand-by computer, and which packets may be ignored (belonging to other system components). This sniffer module 570 preferably sniffs both incoming packets received from outside 512 as well as packets that are sent by the active computer to the outside. The sniffed INPUT transactions that are determined to belong to the active computer are sent to an en-queue/de-queue module 562 in the stand-by computer 510 that stores these received INPUT transactions from the client layer into the stand-by queue 554. Likewise, when the stand-by computer 510 detects that an OUTPUT transaction in reply to the en-queued INPUT transaction has been sent by the active computer to the client layer, the stand-by computer will de-queue the originally received INPUT transaction from the stand-by queue 554. By this sniffing process, the active 530 and stand-by 554 queues should hold the same information at all times, however, the queue information buffers 544, 568 may also be used during subsequent queue synchronization processes to ensure queue consistency.

In a similar manner, the second NIC 552 includes a second sniffer module 572 connected to the second connection information buffer 566 in the stand-by computer 510. This NIC card 552 is again preferably set to promiscuous mode so that all packets on the lower AP server layer are received by the NIC. The sniffer module 572 then uses the attached connection information buffer 566 to determine which packets from the AP server layer were sent to the active computer as OUTPUT transactions. These AP server layer OUTPUT transactions respond to and satisfy an INPUT transaction from the upper client layer such that the corresponding INPUT transaction from the upper client layer should be removed from the queue. Therefore, this second sniffer module 572 is also connected to the en-queue/de-queue module 562 connected to the stand-by queue 554. As INPUT transactions that have been en-queued are satisfied with OUTPUT transactions, these INPUT transactions are de-queued from the active queue 5530 in the active computer 505. Likewise, as these OUTPUT transactions are sniffed by the stand-by computer from the AP server level, the sniffer module 572 causes the en-queue/de-queue module 562 to remove the corresponding INPUT transaction from the stand-by queue 562. Again, synchronization of the active and stand-by queues can be ensured using the queue information buffers 568, 544.

Additionally, INPUT transactions that are sent by the active computer to the AP servers (on behalf of the clients) are also sniffed by the AP server side sniffer 572 in the stand-by computer 510. Sniffing these INPUT transactions sent by the active computer allows the stand-by computer to confirm that the en-queued INPUT transactions sniffed by the sniffer 570 at the client-side of the stand-by computer have actually been subsequently sent by the active computer to the AP layer. This confirmation is important to deal with a situation in which a request transaction is received by the active computer (from the client) but the active computer enters a failure state before sending the request on the AP server layer. Additional information on this will be provided below.

In summary, the stand-by queue 554 works in a similar way to the active queue 530 described above. The general process can be described as follows: (1) INPUT transactions sent by the client to the active computer are sniffed by the client-side sniffer 570 and en-queued in the input queue 556 of the stand-by queue 554; (2) the active computer forwards the received INPUT transaction to the AP layer and the AP-side sniffer 572 in the stand-by computer sniffs this transaction and sets the corresponding input flag 560 in the stand-by queue 554; (3) the AP server responds to the received INPUT transaction by sending an OUTPUT transaction to the active computer which is sniffed by the AP-side stand-by sniffer 572 and en-queued in the output queue 558 of the stand-by queue; and (4) the active computer forwards this received OUTPUT transaction which is sniffed by the client side sniffer module 570 which causes the information related to this INPUT/OUTPUT transaction pair in the input/output/flag queues of the stand-by queue to be de-queued (cleared).

As briefly described above, the guardian 580 in the stand-by computer 510 periodically receives a "normal" signal from the active computer guardian 546 to indicate that the active computer is in normal operation (no failure). When the active computer 505 has an operating system and application failure, the guardian module 580 of the stand-by computer sends a hardware reset command to the active computer and then goes into "pseudo-active" mode by notifying the sniffer modules 570, 576 and the spoofing modules 572, 574 to begin spoofing packets that must be sent from the stand-by queue 554.

Because of the queue synchronization function, the stand-by queue 554 in the (now) pseudo-active computer 510 is identical to that of the active queue 530. While the packet sniffing modules 570, 572 work in the same way as described above, queued requests that must be sent are released to a series of spoofing modules 574, 576 that send out the packets as if they were sent out from the active computer's address. Specifically, the IP address and the MAC address of the NIC cards in the pseudo-active computer are replaced with the IP address and the MAC address of the active computer. This information is passed to the packet spoofing modules 574, 576 from the connection information buffers 564, 566 connected to each NIC.

More specifically, as-INPUT transactions are sniffed and received from the upper client layer to be en-queued, these transactions are also transferred to a packet spoofing module 576 to be sent out to the AP server layer. When the destination AP server receives this packet, it will appear to come from the active computer, and the AP server will respond with a reply OUTPUT transaction addressed to the active computer. When OUTPUT transactions are received by the NIC 552 at the AP server side of the system, the sniffer module 572 receives the packet, de-queues the corresponding INPUT transaction from the stand-by queue 554, and uses a packet spoofer 574 at the client side of the system to send a spoofed packet out to the client layer. Again, it will appear to the destination client computer that the OUTPUT transaction came from the active computer, and the client computer may respond accordingly.

In this way, the takeover destination (stand-by) computer preferably "continues" the transaction management processing of INPUT transactions stored within the active computer queue 530, as well as of new INPUT/OUTPUT transactions received during the time in which the active computer is rebooting, all being completely transparent to the client computer (and the AP servers). As far as the client is concerned, no failure has occurred in the active computer.

When the active computer successfully reboots and again takes control of its respective NIC cards' MAC and IP addresses, the active computer will send the "normal operation" signal (or other trigger) to the guardian 580 of the pseudo-active (stand-by) computer 510. The pseudo-active computer guardian 580 then preferably notifies the sniffer modules 570, 572 and the packet spoofing modules 574, 576 that transactions should no longer be spoofed because the active computer is now capable of processing these transactions on its own. Because the stand-by queue has most likely changed during the time in which the active computer was rebooted, the queue synchronization functionality is preferably used to transmit the queue information from the pseudo-active computer queue 554 and queue information buffer 568 to the same modules 530, 544 on the active computer 505. The active computer is then back "up-to-date" on the packet flow that has occurred during its reboot, and the pseudo-active computer can once again go back into normal stand-by mode. The whole process preferably starts all over again, with the stand-by computer again being able to detect and partially takeover for the active computer should another fault occur in the application and operating system of the active computer.

The above description described a process in which the stand-by computer enters a pseudo-active operation state in response to a fault in the active computer. This system is characterized in that the stand-by/pseudo-active computer is always subordinate to the active computer (will always relinquish control back to the active computer). In an additional embodiment of the present invention, the two system queue computers are more co-equal, with each one capable of being in both the active and the stand-by modes.

In this embodiment, the stand-by computer still sniffs all packets on the network node and determines which INPUT/OUTPUT transactions have been sent to the active computer and should be stored in the stand-by computer queue. When the guardian in the stand-by computer detects that an error has occurred in the active computer (because the active computer has ceased sending the "normal operation" signal to the stand-by computer), the stand-by computer requests that the active computer relinquish its IP and MAC addresses and sends a hardware reset command to the active computer for rebooting. The stand-by computer then enters pseudo-active mode (described above) in which packets are spoofed based on the NIC information stored in the connection information buffer. This process proceeds exactly as that described above.

However, soon after the failure of the active computer is detected, the stand-by (now pseudo-active) computer also sends out a request to a network host for acquisition of the IP address and MAC address of the active computer that have been relinquished by the rebooting of the active computer. After some interval, the pseudo-active computer will acquire use of the IP address and MAC address of the two active NIC cards for use in the two pseudo-active NIC cards. At this point in time, packets that were addressed to the (formerly) active computer will now be received by the pseudo-active computer which has acquired the former active computer's address information. Therefore, the pseudo-active computer can enter full active mode and will no longer spoof packets or sniff all of the network communications. Instead, the (former) stand-by computer has now completely taken over processing operations for the (former) active computer. This full takeover procedure is transparent to both the upper client level and the lower AP server level.

In addition to the above stand-by-to-active transition, the (former) active computer 505 has been rebooted. The reboot preferably occurs with the computer 505 being assigned new IP and MAC addresses for each of its NICs. To aid in a future takeover process should a fault occur in the new active queue computer 510, the former active queue computer 505 is preferably placed in stand-by mode and assumes the functionality that was formerly employed by the original stand-by computer 510.

Initially, the new active computer 510 will send information from its internal queue 554 and queue information buffer 568 to the new stand-by computer 505 so that the internal queues are equivalent (a process which can be checked using a queue synchronization procedure). Data from the connection information buffers 564, 566 is sent from the new active computer 510 to the connection information buffers 540, 542 in the new stand-by computer 505. The guardians 546, 580 will work in the reverse of the above process (former active computer 505 monitoring the former stand-by computer 510). Packet sniffing modules in the new stand-by computer (not shown) will then proceed to promiscuously sniff all packets off of the network and use the information in the connection information buffer to store INPUT/OUTPUT transactions that are sent to the new active computer 510 in its internal queue 554.

If a fault occurs on the new active computer 510, the above process will again switch the active and stand-by computers. In this way, the two queue computers are more "co-equal," with each queue computer taking over processing operations for the other computer when a fault occurs.

An additional embodiment of the present invention preferably involves a third or more additional computers that are part of the queue computer system. In general, any number of stand-by computers may be used as long as the internal transaction queues are kept consistent with the active queue. In this way, all of the queue computers may takeover for each other when the current active queue computer enters a failure state. Alternatively, for ease of programming, each queue computer may be used only until a failure, and then the failed computer is not rebooted. An almost limitless number of permutations of this theme may be employed.

Further the stand-by computer may facilitate the full takeover of the active computer by a third computer. For example, if the active computer enters a failure state, the stand-by computer preferably enters pseudo-active mode and spoofs packets on behalf of the active computer. At this time, a third computer may request the IP and MAC addresses used by the active computer. Upon receiving control of these IP and MAC addresses, this third computer may enter the active state and the pseudo-active computer will preferably again return to the stand-by state (for example, because the third computer sent a trigger to the pseudo-active computer). This third computer preferably includes an internal queue that is maintained consistent with the active queue during normal operation, so that takeover is effectuated easily in response to a failure in the active computer. However, in an alternative embodiment, the stand-by computer may send queue information the third computer only when the stand-by computer enters pseudo-active mode (indicating a failure of the active computer). This queue information can then be used by the third computer as the new active queue information when the third computer enters the active state.

Figure 6:
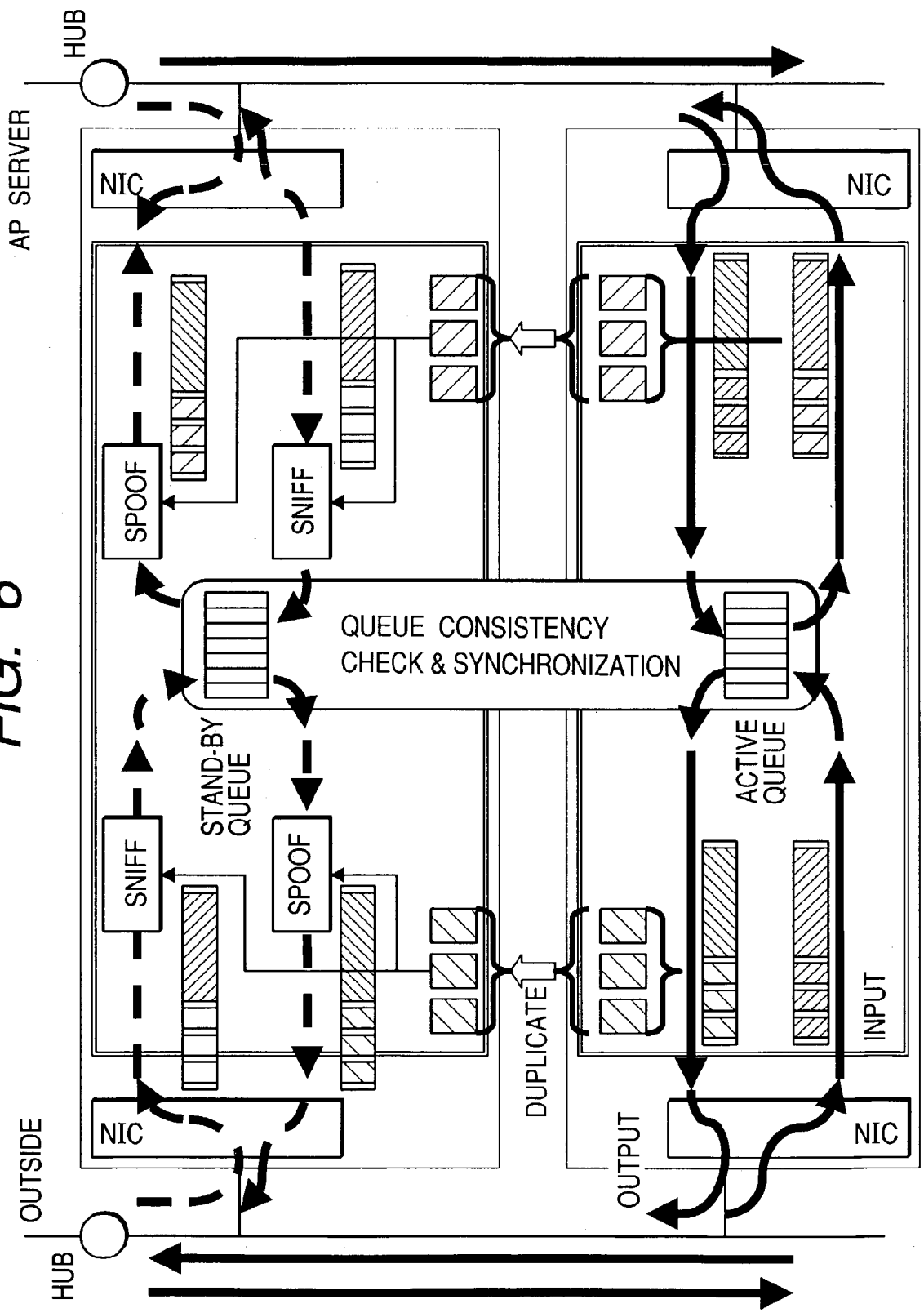
FIG. 6 shows a simplified version of a queue computer system in which the AP server and queue computers are combined.

FIG. 6 shows a somewhat lower level system outline of the queue computer system depicted in FIG. 5. The module orientations of this diagram correspond to the system block diagram found in FIG. 5. This embodiment of the present invention includes a plurality of NICs in each of the active and stand-by computers—one NIC connected to the upper client layer and another NIC connected to the lower AP server layer. The upper-part of FIG. 6 shows the stand by computer and the lower part of FIG. 6 shows the active computer.

In the center of FIG. 6, there is shown an internal queue for both the active and stand-by computers. As described above, these queues hold the incoming requests or packets, from both the upper client layer and the lower AP server layer, until they are sent out for processing. These queues may also hold flag information that aids in the processing of requests during a failure of the active computer. Packets being sent into and out of each of these queues (to and from the various NICs) are processed through a pipeline that orderly inserts the packets into (en-queues) and removes the packets from (de-queues) the internal queues. The solid lines show an exemplary flow of transactions to and from the active queue in the active computer and the dashed lines show an exemplary flow of transactions to and from the stand-by queue in the stand-by computer. There is also a queue consistency check and synchronization block which determines whether the two internal queues hold equivalent data. If the data is not equivalent, the queue consistency and synchronization block preferably transfers the queue information and stored packets from the active computer to the stand-by computer that consistency can be achieved.

The connection information buffers are shown as data storage and transmission elements existing in both the active and stand-by computer. These elements are communicatively connected to each other such that the connection buffer information in the active computer (e.g., MAC address, IP address, sequence number, and crypt key) may be shared with the stand-by computer. This information sharing both identifies which packets sniffed by the stand-by computer should be stored in its internal queue, as well as enables the spoofing of packets by the stand-by computer in a case when the active computer fails.

Figure 7:
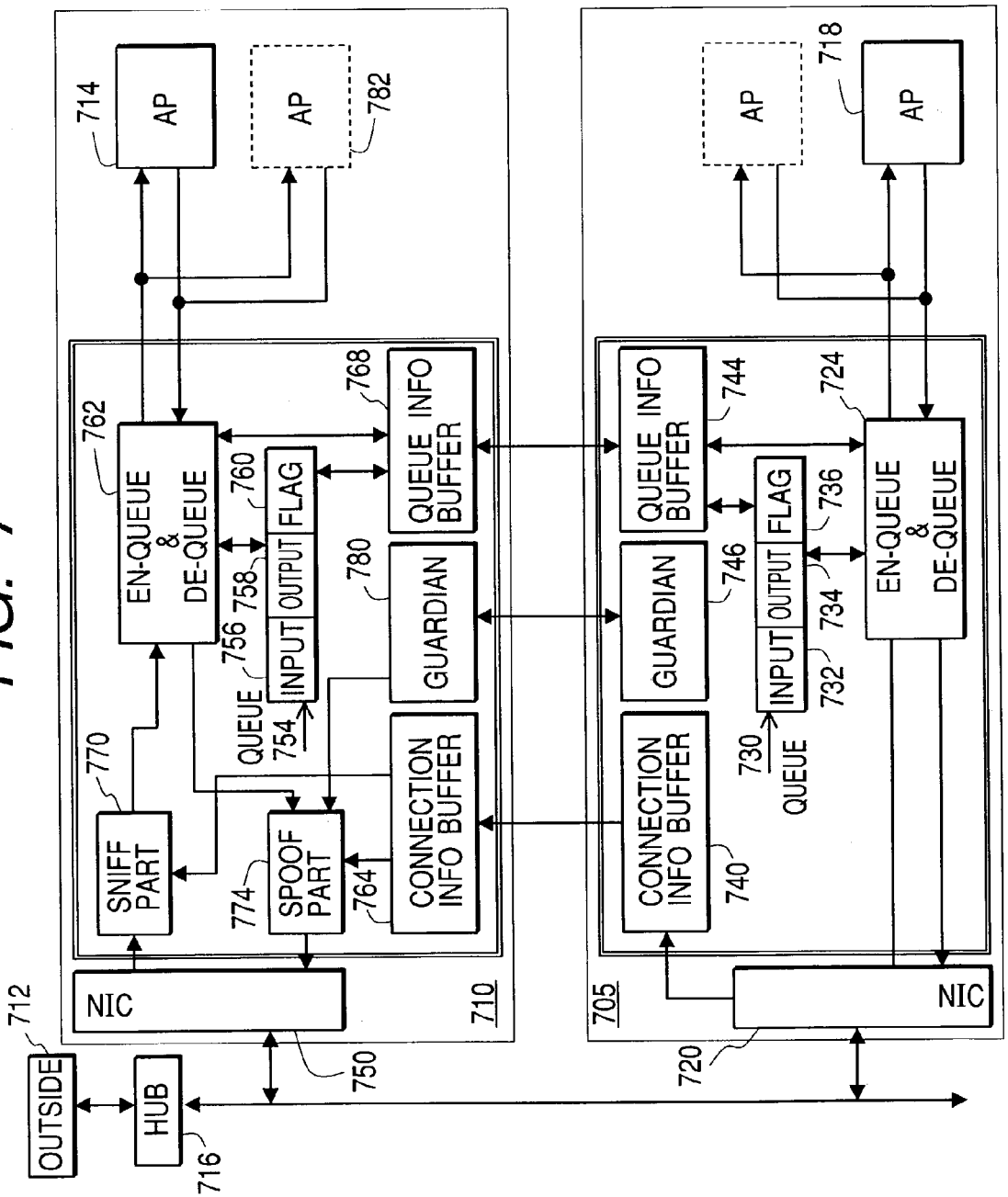
FIG. 7 shows a lower level block diagram of a queue computer system according to the present invention.

FIG. 7 shows a simplified version of the queue computer system of the FIG. 5. In FIG. 7, the AP server functionality (e.g., the processing) is incorporated into the queue computers themselves. The module orientations and reference numerals correspond to those in FIG. 5, and only the differences will now be described.

Because the AP servers 714, 718 are included in the queue computers 710, 705, there is no AP server layer in the network. The INPUT transactions from the client computers 712 are sent to the active queue computer 705 for processing by the AP server 718 in the active queue computer. After processing, the AP server 718 in the active queue computer 705 responds to the received INPUT transaction with a corresponding OUTPUT transaction. Therefore, use of the active 730 and stand-by 754 transaction queues is simplified as now described.

For the active computer 705, a received INPUT transaction is en-queued into the input queue 732 of the active queue 730 and is sent to the AP server 718 for processing. If the INPUT transaction is successfully sent to the AP server 718, an input flag 736 may be set in the active queue 730. Likewise, this incoming packet is preferably sniffed by the stand-by computer sniffer 770, and the INPUT transaction is en-queued in the stand-by queue 754. The input flag 760 in the stand-by computer 710 may either be ignored (because there is no external transaction between the active computer and the AP server to sniff) or some type of communication between the active computer 705 and the stand-by computer 710 may set the input flag 760 in the stand-by computer if the INPUT transaction reaches the AP server 718.

When the AP server 718 in the active computer 705 responds to the client 712 with an OUTPUT transaction, that transaction is preferably stored in the output queue 734 of the active computer and then sent on the client computer. If successfully sent, the input/output/flag of the active queue 730 for that transaction are de-queued (cleared). Likewise, the OUTPUT transaction may be internally en-queued in the output queue 758 of the stand-by computer 710, or the stand-by computer may ignore this step. However, once the stand-by computer sniffer 770 sniffs the OUTPUT transaction being sent to the client computer 712, the stand-by computer 705 will de-queue this transaction from the stand-by queue 754.

Upon a failure of the active computer 705, pseudo-takeover and full takeover operations are undertaken in much the same way as described above. The processing involved with the present embodiment is simplified with respect to FIG. 5. Therefore no further information about the scheme is necessary here.

To provide an even clearer understanding of the various embodiments of the present invention, a discussion will now be provided based on a series of flow charts which describe, in great detail, an exemplary system operation scheme. The flow charts will step through the entire process from initialization of the active and stand-by computers, through normal operation of the system, through pseudo-takeover and full takeover, and up to the rebooting of the active computer after failure. The flow charts refer to system elements that were described above, however only an exemplary system will be described.

Figure 8:
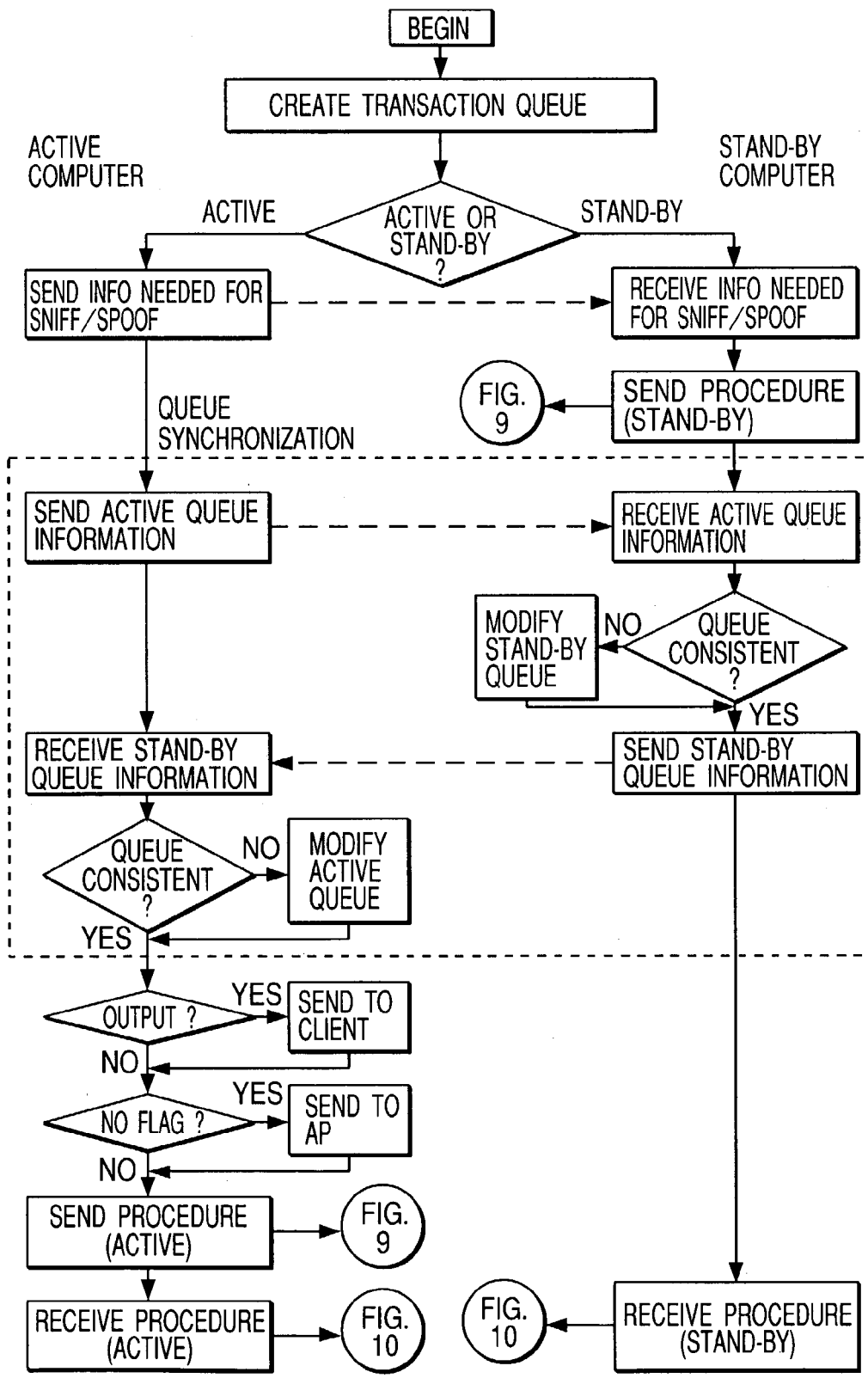
FIG. 8 is a flow chart of the initialization processes for both the active and stand-by computers.

FIG. 8 is a flow chart of exemplary start-up procedures for both the active and stand-by queue computers. The most important procedure during start-up is to create and synchronize the transaction queues in the active and stand-by computers. The amount of information transferred between the active and stand-by computers is preferably limited so as to make the start-up process as brief as possible. As such, all transaction data may not be transferred initially. This start-up procedure occurs not only during initial system powering, but also during a hardware or software rebooting process occurring in response to a fault state in one of the queue computers.

The FIG. 8 process begins with both the active and stand-by computers creating and initializing a transaction queue. The methodology then splits between active and stand-by queue computers. The active computer sends information to the stand-by computer that the stand-by computer needs to sniff and/or spoof network packets for the active computer, should a failure occur in the active computer. Specifically, the active computer will send the IP and MAC addresses of its NICs, sequence number and cryptographic key to the stand-by computer. The stand-by computer receives this information and preferably stores it in one or more connection information buffers (depending on how many NICs are used).

Figure 9:
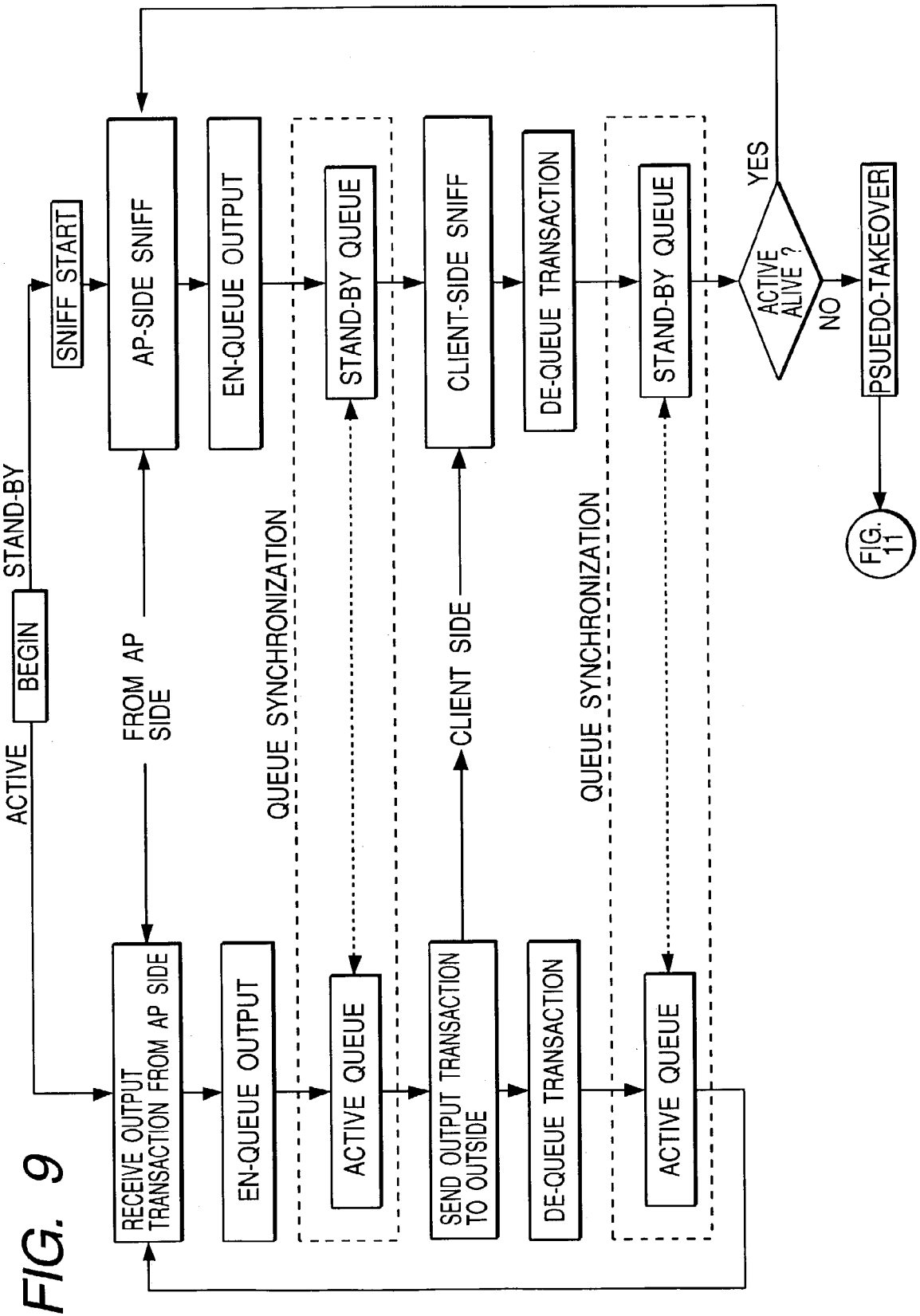
FIG. 9 is a flow chart of the SEND procedures for both the active and the stand-by computers during normal system operation.

The stand-by computer next executes an initial send procedure, detailed in the right side of FIG. 9, in order to "sniff" any packets on the AP server side of the system (e.g., based on the IP or MAC address of the active computer NIC). Continuing with the FIG. 8 startup process, the queue synchronization sub-process then begins with the active queue computer sending the active queue information to the stand-by queue computer. The current standby queue is then compared to this received active queue information to determine if they are consistent with each other. If the stand-by queue is not consistent with the received active queue, then the stand-by queue is modified to thereby synchronize the two queues.

If the stand-by queue is consistent with the received active queue (or after the stand-by queue has been modified), the stand-by queue information is then sent back to the active computer to re-check the queue synchronization. At the active computer, the received stand-by queue information is checked against the active queue to determine if the two queues are consistent with each other. If the received stand-by queue and the active queue are not consistent, then the active computer queue will be modified to establish consistency between the two queues. This back and forth process is labeled "queue synchronization" in FIG. 8. This process is repeated in subsequent drawings, but is drawn only as a queue synchronization block, for purposes of clarity.

If the two queues are consistent, or after the active queue has been modified, the active computer will then send initial transactions to the client and AP server layers based on the information in the active queue. For example, as described above, the active queue preferably includes an input queue that includes INPUT transactions received from the client, an input flag that indicates that the received INPUT transaction has been forwarded to the appropriate AP server, and an output queue that lists the OUTPUT (reply) transaction that corresponds to the INPUT transaction in the active queue.

The queues are useful for determining what action must be taken in various circumstances (e.g., after active computer failure). If an INPUT transaction is in the active queue with a flag but no OUTPUT transaction, then the INPUT transaction has been properly sent and the system is awaiting the corresponding OUTPUT transaction from the AP layer. If an INPUT transaction is in the queue without a corresponding input flag, then that INPUT transaction has been received by the active computer but was not properly forwarded to the AP server (and must now be sent). Finally, if an OUTPUT transaction is found in the active queue, then this OUTPUT transaction was received from the AP side but was not forwarded to the appropriate client (and de-queued). Therefore, this OUTPUT transaction must be sent to the client.

According to the above queue guidelines, in this initialization process, the active computer begins by checking for any OUTPUT transactions in the active computer queue. If any, the OUTPUT transactions are sent to the appropriate client computer (outside), and the input/output/flag information for that transaction are de-queued (cleared) once a delivery acknowledgement from the client computer is received. Next, any INPUT transactions in the active queue which do not have a corresponding input flag set are preferably sent to the appropriate AP side computer. After acknowledgement of receipt from the AP side, a flag is added to the input queue of the active computer corresponding to the INPUT transaction that was just sent. Presumably, the AP-side sniffer of the stand-by computer will sniff these transactions and perform similar de-queuing and flag setting functions.

Figure 10:
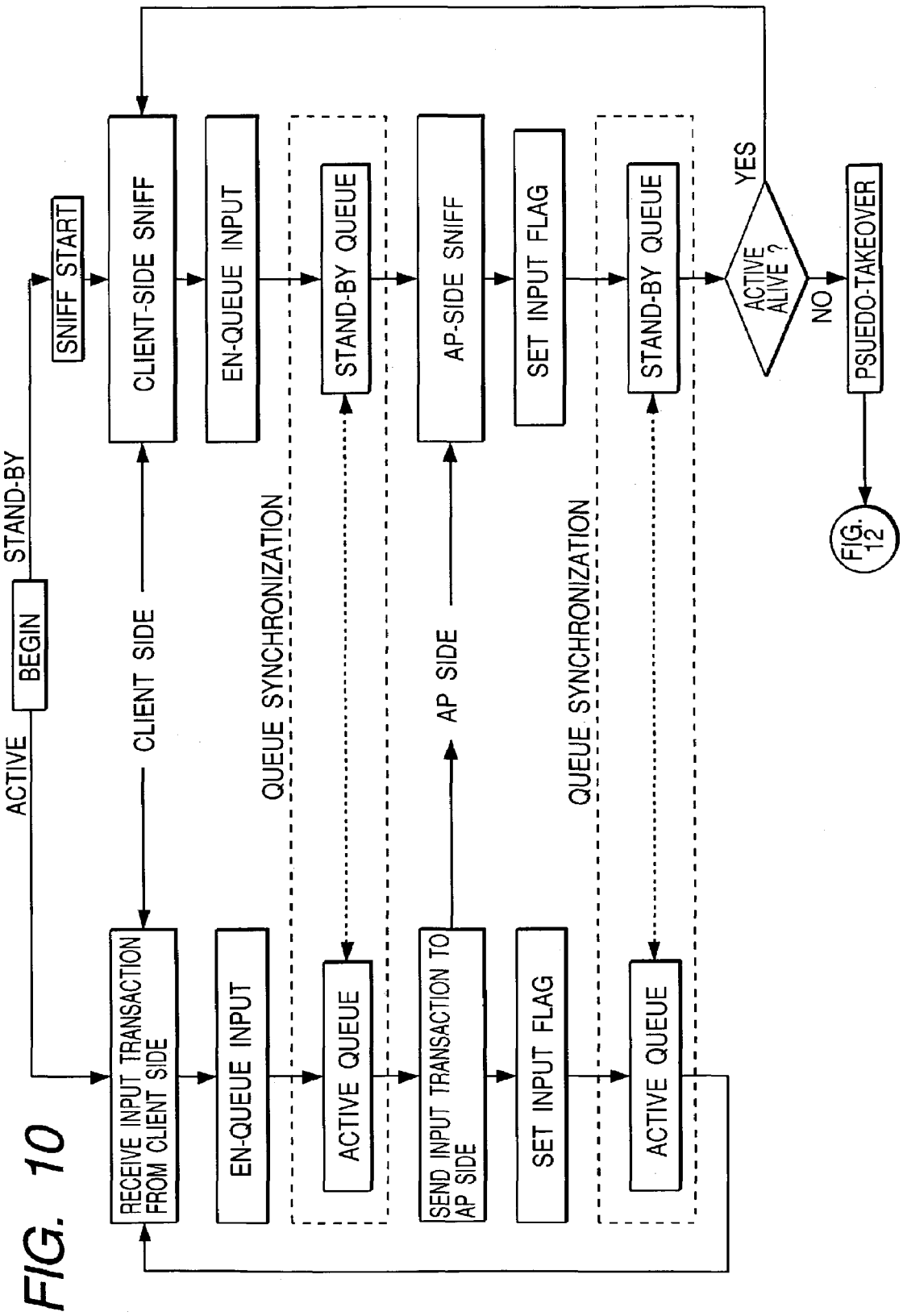
FIG. 10 is a flow chart of the RECEIVE procedures for both the active and the stand-by computers during normal system operation.

Thereafter, the active computer proceeds to execute packet sending (INPUT transactions) and packet receiving (OUTPUT transactions) methods as described with respect to FIG. 9 and FIG. 10, respectively. Likewise, the stand-by computer will receive (sniff) packets according to the methodology outlined in FIG. 10 and described below.

FIG. 9 details the basic send procedure performed by the active computer and the stand-by computer during normal (stand-by) operation. The send operation represents the sending of an OUTPUT transaction from the AP side to the client side in response to a previously received INPUT transaction. The FIG. 9 methods of the active and stand-by computers work in concert with each, with the active computer receiving, sending, and de-queuing the transaction (left side of FIG. 9) and the stand-by computer sniffing these transactions and updating the stand-by queue in a similar manner (right side of FIG. 9).

On the active computer side, OUTPUT transactions that are from the AP server layer to be sent out to the client layer are received by the active queue computer and are temporarily stored in the output queue of the active queue in a location that matches it with the previously received corresponding INPUT transaction. At the same time, the stand-by computer begins an AP-side sniffing procedure that sniffs all of the OUTPUT transactions sent from the AP servers to the active queue computer (to be sent on the client computers) as well as all INPUT packets that are sent from the active queue computer to the appropriate AP computer. The received OUTPUT transaction described above will be sniffed by the stand-by computer AP-side sniffer, and this OUTPUT transaction will be stored in the stand-by queue in the appropriate output queue.

The active and stand-by computers then preferably engage in a queue synchronization process (described above) in which the active queue information is sent to the standby computer where it is compared to the stand-by computer queue information. If the stand-by queue is not consistent with the received active queue information, then the stand-by queue information is updated. The stand-by queue information is then sent to the active computer where the active computer information will be synchronized with the stand-by queue.

After synchronization, the active computer will send the OUTPUT transaction (stored in the output queue of the active queue) to the appropriate client computer. After acknowledging receipt, the combination of the input/output/flag information for this transaction will be de-queued. Likewise, the client-side sniffer of the stand-by computer will sniff the OUTPUT transaction sent to the client computer by the active queue computer and will de-queue the same transaction in the stand-by queue. Queue synchronization preferably commences again (first at the stand-by computer, then at the active computer).

At this point, the send operation is complete, and the stand-by computer preferably uses the guardian block to determine whether or not the active computer is still "alive" or not in failure (e.g., ceases sending an "OK" signal to the stand-by computer). If the active computer is still active, then the stand-by computer send process loops back up to the top of FIG. 9, and the stand-by computer continues to sniff those packets that are sent by the active computer. Preferably, this sniffing proceeds while any queue synchronization processing is occurring. If the stand-by computer detects an error (fault) in the active computer, then the stand-by computer enters pseudo-active mode, as explained with respect to FIG. 11, below.

FIG. 10 depicts the basic receive procedures followed by the active computer (left side of FIG. 10) and the stand-by computer (right side of FIG. 10) during normal (stand-by) operation of the system. The receive procedure describes the passing of INPUT transactions from the client to the AP server. Initially, an INPUT transaction that is properly addressed to the active computer from the client layer (outside) is received by the active computer and en-queued into the input queue section of the active queue. At the same time, the client-side sniffer of the stand-by computer sniffs this received INPUT transaction and stores (en-queues) that transaction in the stand-by queue. As described above, this sniff process preferably is initiated by putting the client-side NIC on the stand-by computer into promiscuous mode to receive all client-side network packets. These packets are then filtered by the packet sniffer using the active computer information found in the connection information buffer (i.e., the active NIC's MAC and IP address).

Queue synchronization in undertaken (as above) by sending the active queue information to the stand-by queue, comparing the queues for consistency, and then modifying the stand-by queue if the queues are not consistent. The stand-by queue information may then be sent to the active queue for the reverse process to complete synchronization. Preferably, the active queue information is given priority because the resource-intensive sniffing process may cause the standby computer to occasionally miss packets.

After synchronization, the active computer sends the received INPUT transaction out to the AP server layer (or the attached AP server functionality) for processing, and the input flag in the active queue is set which corresponds to the sent INPUT transaction (after acknowledgement). This input flag indicates that the received INPUT transaction has been successfully sent to the AP layer. At the same time, the AP-side sniffer in the stand-by computer will sniff the INPUT transaction sent out to the AP layer and will set the corresponding flag in the stand-by queue. The active and stand-by queues should hold equivalent information at this point.

A second queue synchronization process is then preferably undertaken to ensure that the active and stand-by queues are the same. Preferably, this synchronization occurs first at the stand-by computer and then on the active computer, thereby giving priority to the data found in the active queue.

After synchronization, the stand-by computer uses the guardian block to determine if the active computer is in a fault state, and, if so, initiates a packet spoofing procedure as described below with respect to FIG. 12. If the active computer is operating normally, the FIG. 10 standby computer processing loops back up to sniff additional network packets.

Figure 11:
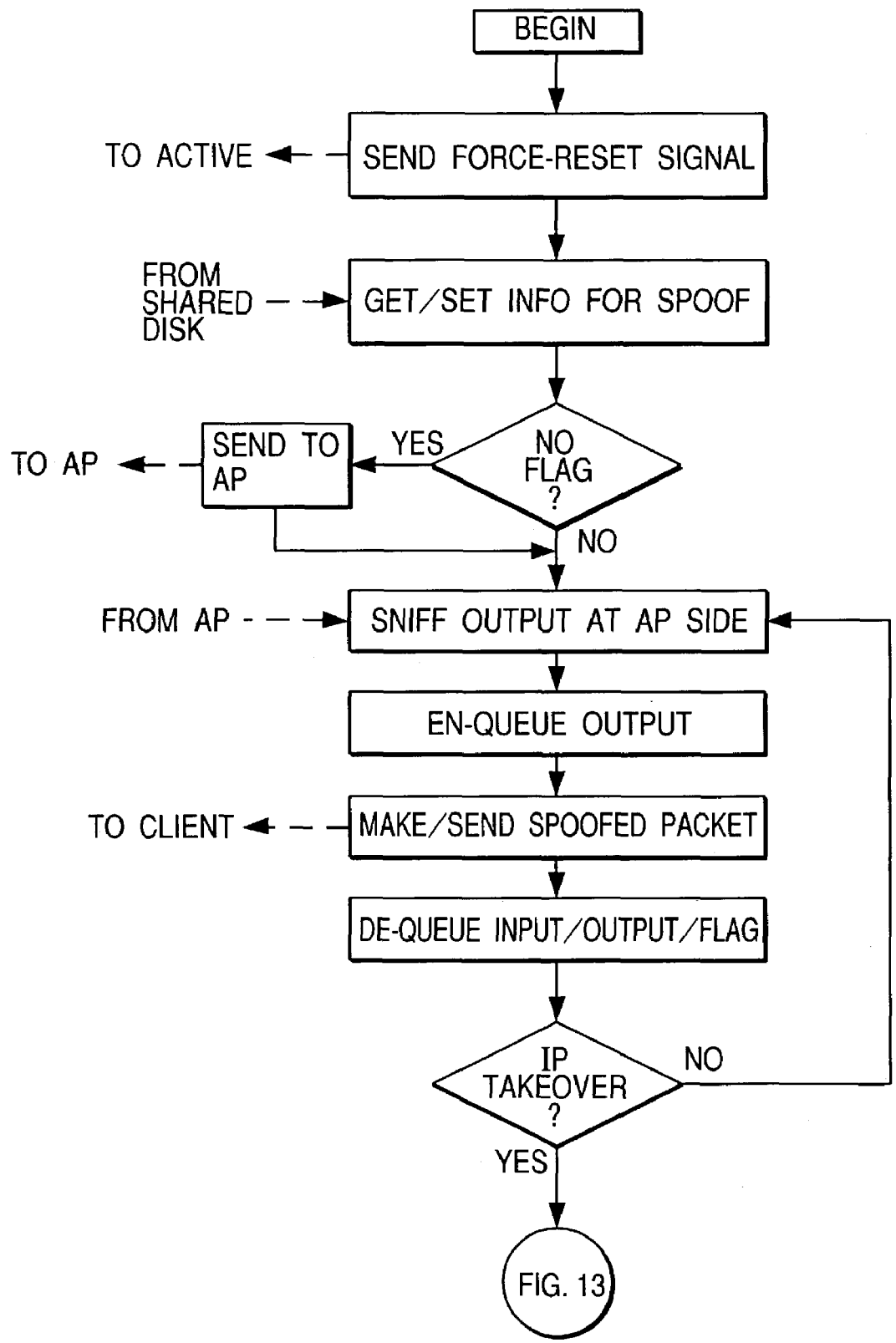
FIG. 11 is a flow chart of the RECEIVE procedure for the stand-by (pseudo-active) computer during pseudo-takeover.

FIG. 11 details the procedure by which the stand-by computer goes from the stand-by state to the pseudo-active state (as entered from FIG. 9) and continues to receive packets via a sniff procedure. This procedure is considered the send procedure in pseudo-active mode. Upon determining (through the use of the guardian described above) that a fault has occurred in the active computer, the stand-by computer enters the pseudo-active state by sending a forced-reset signal to the active computer. This forced-reset signal is preferably a hardware or system board reset signal that forces the active computer to enter a rebooting process, thereby at least temporarily giving up its IP and MAC addresses. The stand-by computer must therefore continue to sniff packets that are intended for the active computer and to spoof responses to those packets.

While the packet sniffing process continues, the standby computer (now in pseudo-active mode) receives information needed to spoof packets for the active computer (which is now in failure). This information includes the IP and MAC addresses of the active computer, any cryptographic keys, sequence number, and any other relevant information. Much of this information may have been received at the initial start-up procedure, and the remaining needed information is preferably received from a shared disk (with the active computer) or other mechanism.

The stand-by queue is then checked to determine if any packets need to be sent out. As described above, any INPUT transactions in the queue that do not have an input flag associated with them represent INPUT transactions that were received from the client side but which were never successfully forwarded to the AP side. Therefore, if any queued INPUT transactions are missing the input flag in the stand-by queue, these transactions should be sent to the AP stand-by queue via a spoofing procedure using the active computer's address information as the packet source. After sending, the appropriate input flag is then set in the stand-by queue.

After queue synchronization, the stand-by computer will enter a looping procedure in which OUTPUT transactions are spoofed to the client. Initially, the AP-side sniffer will sniff all OUTPUT packets that are intended to be sent to the active computer. These received OUTPUT transactions will be en-queued into the output queue portion of the stand-by queue in a location that corresponds to the previously received INPUT transaction that matches the OUTPUT transaction. A spoof packet is then made using the active computer address information, and the spoofed OUTPUT packet is sent to the appropriate client computer. Upon receipt of a delivery acknowledgement from the client, the input/output/flag data corresponding to the INPUT/OUTPUT transaction just sent are de-queued from the stand-by queue.

The stand-by computer then determines if full IP-takeover is desirable, and if so, enters the IP-takeover process described below with respect to FIG. 13. If not, the pseudo-active send procedure will loop back and wait for the next OUTPUT transaction to be sniffed by the AP-side sniffer.

Figure 12:
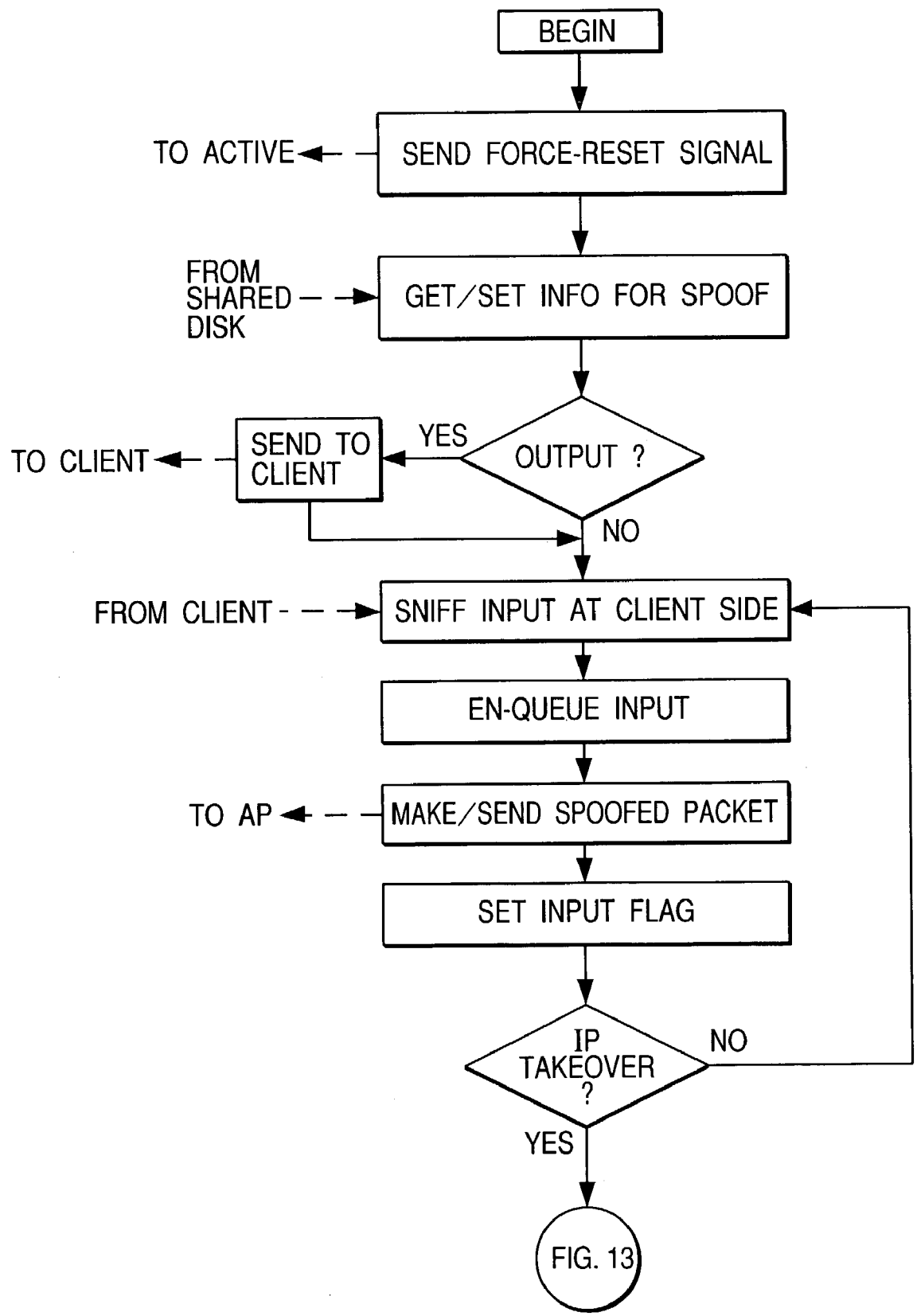
FIG. 12 is a flow chart of the SEND procedure for the stand-by (pseudo-active) computer during pseudo-takeover.

FIG. 12 details the pseudo-takeover receive procedure performed by the stand-by computer after it enters the pseudo-active state (from FIG. 10). This pseudo-active receive procedure allows the stand-by computer (now in pseudo-active mode) to spoof INPUT packets on behalf of the active computer. The process begins with the standby computer sending a force-reset signal to the active computer and receiving the necessary address information to spoof packets on behalf of the active computer (which is now rebooting), if these processes have not already been preformed with respect to the send procedure in FIG. 11.

The stand-by computer then checks the stand-by queue to see if there are any transactions in the output queue portion of the stand-by queue. If there are, these queued transactions represent OUTPUT transactions that have been received from the AP-side but have not been properly sent on to the appropriate client computer. Therefore, the stand-by computer will send these transactions to the client side, and, after receiving an acknowledgement from the client, will de-queue the input/output/input flag data that corresponds to this sent OUTPUT transaction from the stand-by queue.

The stand-by computer then preferably enters a looping procedure in which INPUT transactions received from the client side will be en-queued and then forwarded to the appropriate AP computer. Initially, the client-side sniffer will sniff an incoming INPUT transaction from the client computer (intended for the active computer), and will en-queue this new INPUT transaction in the input queue of the stand-by queue. The stand-by computer then forms a spoofed packet for this INPUT transaction (one that appears to be sent by the active computer) from the active queue information that has already been received by the stand-by computer. The stand-by computer then sends this spoofed packet to the AP side of the network and sets an appropriate input flag in the stand-by queue reflecting that the INPUT transaction was successfully sent to the AP side.

Figure 13:
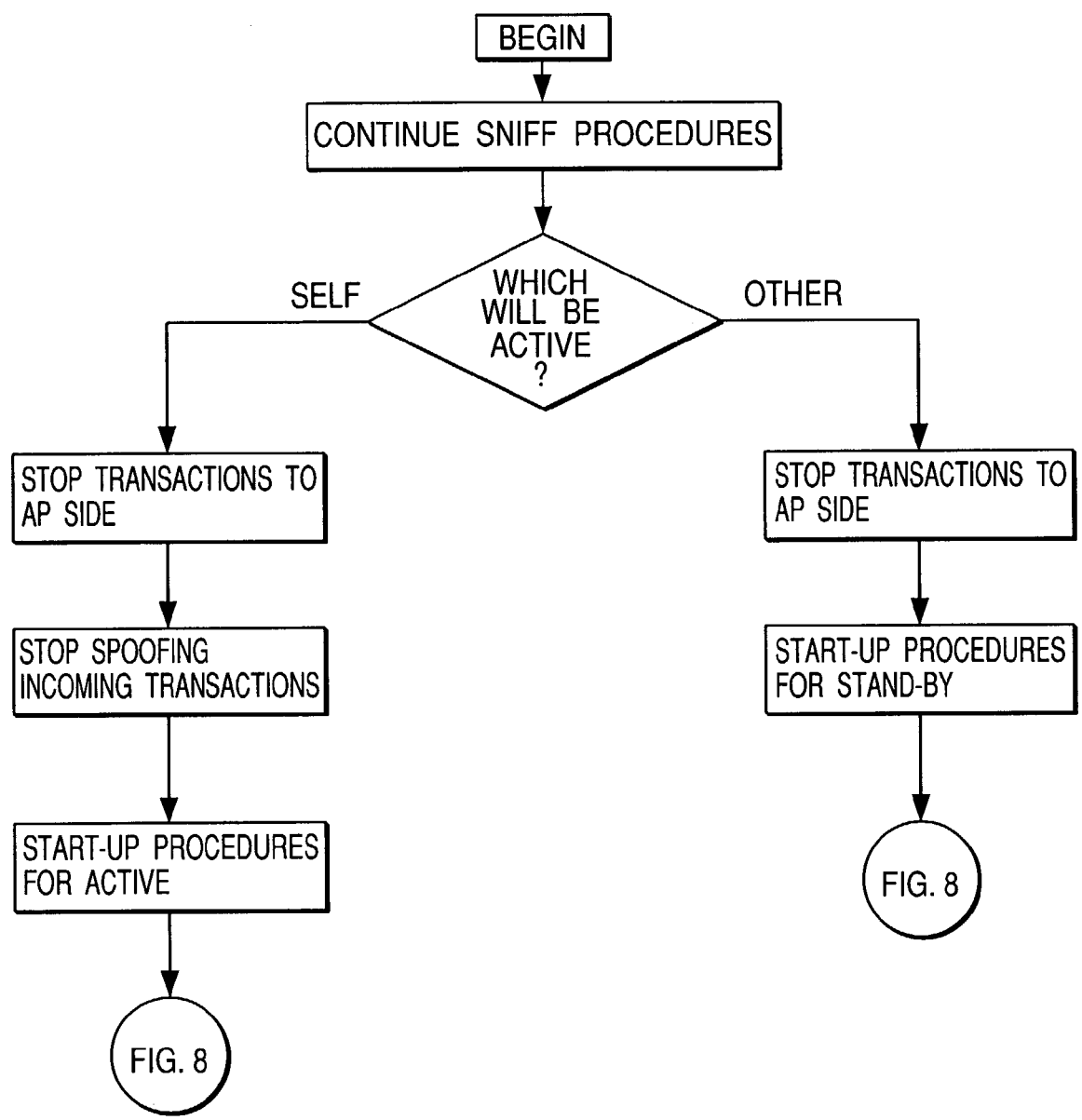
FIG. 13 is a flow chart of the takeover procedure for both the stand-by computer and an additional computer.

After this packet spoofing process, the stand-by computer determines whether or not an IP takeover process should be performed (FIG. 13). If no IP takeover process is to be performed, then the process loops back to receive the next INPUT transaction from the client side. The next spoofed packet will then be prepared. The pseudo-active procedures of FIGS. 11 and 12 preferably continue for as long as the stand-by computer is in pseudo-active mode (e.g., until the active computer gets rebooted, regains control of its IP and MAC addresses, and begins transferring transactions again).

If during either of the above pseudo-active sending (FIG. 11) or receiving (FIG. 12) procedures described above, the active computer successfully reboots, the stand-by computer preferably sends the stand-by computer information to the active computer so that the active computer will have current queue information. The active computer can then begin to normally process INPUT and OUTPUT requests, and the active and stand-by computers can enter the regular operation flow charts of FIGS. 9 and 10.

If during either of the above pseudo-active sending (FIG. 11) or receiving (FIG. 12) procedures described above, the stand-by computer determines that it should facilitate a full takeover of the active computer, the FIG. 13 procedure is used. As shown in FIG. 13, the stand-by computer (now in pseudo-active mode) can transfer active control to either itself or to another computer. The takeover procedure begins by continuing to receive packets intended for the active computer via sniffing processes at the AP and client sides of the network. However, the stand-by computer then makes a determination whether it is going to become the new active computer itself, or whether the stand-by computer will enable another computer to become the active computer.

If the stand-by computer determines that it will become the active computer itself (left side of FIG. 13), the stand-by computer will continue its sniffing operation, but it will cease sending newly received INPUT transactions to the AP side. Therefore, although the transactions are queued, they will not be sent out for processing until the stand-by computer becomes the active computer. Also, the stand-by computer (in pseudo-active mode) will cease spoofing packets for the active (now in failure) computer. Instead, the stand-by computer will perform the start-up procedures as the ACTIVE computer to synchronize its own queue (which is now the active queue) with a queue found on another computer which will now be the new stand-by computer (see, FIG. 8). This new stand-by computer may be the former active computer or it may be an additional computer, as described above. After initialization according to FIG. 8, the former stand-by computer is now the active computer.

If the stand-by computer determines that an additional computer should become the new active computer (right side of FIG. 13), the stand-by computer will continue sniffing packets but will again cease sending out new INPUT transactions to the AP side of the system (so that no new OUTPUT responses from the AP side of the system will be received). The stand-by computer will then perform the start-up procedures as the stand-by computer so that its queue will be synchronized with the active queue found in the additional computer that is now the active computer. This additional computer was preferably also in stand-by mode during this whole process such that the additional (new active) computer's queue will hold the same information as the stand-by computer queue. Alternatively, the stand-by computer that is in pseudo-active mode could send the queue information to the computer that is to be the active computer. In this way, any number of stand-by computers may be used with the present invention to ensure a continued and transparent switch from one active computer to another, as each of these active computers enters a failure state.

As described above there are many alternatives embodiments that could be used according to present invention to enable a transparent takeover for an active queue computer. One such embodiment utilizes the general takeover scheme of the present invention to provide a localized takeover of the AP server, when a selected AP server encounters a failure. For example, FIG. 5 shows a second "stand-by" AP server 582 that is connected to both the original AP server 514 and the AP layer network node 518. This AP server 582 preferably monitors the activity of the first AP server 514 to shadow the functionality of the first AP server.

When the stand-by AP server 582 detects a failure of the first AP server 514, it preferably has all of the information needed to complete the current transaction that was in the first AP server at the time of failure. Because of connection buffer information, the stand-by AP server 582 is preferably able to spoof packets on behalf of the first AP server 514 while the first AP server reboots. The stand-by AP server 582 would therefore include transaction sniffing and spoofing capabilities to enable this localized takeover. This takeover would be transparent to the queue computer 505, 510 in the same way that the above queue takeover is transparent to the client layer. After rebooting the first AP server 514, the first AP server is preferably again made the primary or active AP server. All of the functionalities will work in a way that parallels the above descriptions.

Alternatively, the stand-by AP server 582 may send a gratuitous ARP to the queue computers 505, 510 to notify them of a change in the AP server address (because of a switch in the AP servers due to the failure). The stand-by AP server 582 may also just reboot the first AP server 514 in response to a detected failure. In all, many different schemes could be used, and each of these schemes may be used in combination with, or completely separate from the above active/stand-by queue computer orientation.

FIG. 7 shows how this local AP server takeover method may be constructed in the single NIC example. Again, a stand-by AP server 782 is attached to the existing AP server 714 and the transaction queue (or en-queue/de-queue module 762) of the queue computer 710. This embodiment could utilize any of the above AP server takeover methods described above, with the methods being slightly simplified to accommodate the present queue computer system. This local AP takeover may also be used either in combination with, or separate from, a queue computer takeover method.

Also, as described above, although the examples herein have been largely directed to a queue computer system that exists between the client and the AP server layers of a network, this configuration was merely exemplary and can be applied between any two network layers. Various orientations and features may be more appropriate for specific layers, and all of these various combinations are within the scope of the present invention.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A machine takeover method in a server system including a plurality of servers connected to a network node through which communication packets directed to each of the plurality of servers run commonly, the machine takeover method, in which a second server under a stand-by status succeeds to a transaction management operation for transactions directed to a first server when the first server, which performs transaction management using a first queue, falls into a failure state, comprising the steps of:

monitoring, by the second server, input packets directed to the first server and output packets from the first server at the network node;

en-queuing, by the second server, transactions directed to the first server into a second queue;

instructing the first server to cease transaction management for transactions directed to the first server in response to a first machine takeover trigger; and succeeding, by the second server, to the management operations of untreated transactions remaining in the second queue by transferring the untreated transactions to an application server, generating reply packets spoofing an address of the first server as a source address for the reply packets, and outputting the reply packets on said network node.

2. A machine takeover method in a server system including a plurality of servers connected to a network node through which communication packets directed to each of the plurality of servers run commonly, the machine takeover method, in which a second server under a stand-by status starts deputy operations for treating transactions directed to a first server when the first server, which performs transaction management using a first queue, falls into a failure state, comprising the steps of:

performing, in the second server, the deputy operations by monitoring packets directed to the first server, en-queuing the transactions directed to the first server into a takeover queue, transferring the transactions directed to the first server to an application to perform the transactions, generating reply packets spoofing an address of the first server as a source address of the reply packets, and outputting the reply packets on said network node;

ceasing the deputy operations in response to a second trigger for a formal takeover to a server selected to succeed to the formal transaction management; and succeeding, by the server selected to succeed to the formal transaction management, to the management operations of untreated transactions remaining in the takeover queue.

3. A machine takeover method according to claim 2, wherein said server selected to succeed to the formal transaction management is the first server.

4. A machine takeover method according to claim 2, wherein said server selected to succeed to the formal transaction management is a third server other than the first and second servers.

5. A machine takeover method according to claim 2, wherein said second server returns, in response to said second trigger, to the stand-by state by starting monitoring of input packets to and output packets from said server selected to succeed to the formal transaction management, and en-queuing transactions directed to said server selected to succeed to the formal transaction management.

6. A machine takeover method according to claim 2, wherein said succeeding step includes the step of copying the untreated transactions remaining in the takeover queue into the server selected to succeed to the formal transaction management.

7. A machine takeover method in a server system including a plurality of servers connected to a network node through which communication packets directed to each of the plurality of servers run commonly, the machine takeover method, in which a second server under a stand-by status starts deputy operations for treating transactions directed to a first server when the first server, which performs transaction management using a first queue, falls into a failure state, comprising the steps of:

performing, in the second server, the deputy operations by monitoring packets directed to the first server, en-queuing the transactions directed to the first server into a takeover queue, transferring the transactions directed to the first server to an application to perform the transactions, generating reply packets spoofing an address of the first server as a source address of the reply packets, and outputting the reply packets on said network node; and taking-over, by the second server, said address of the first server to formally succeed to the transaction management operation in response to a third trigger indicating that a server is ready to become a stand-by server for the second server.

8. A machine takeover method according to claim 7, further comprising the steps of:

monitoring, by said stand-by server, input packets directed to the second server and output packets from the second server at the network node; and en-queuing, by said stand-by server, transactions directed to the second server.

9. A machine takeover method according to claim 8, wherein said stand-by server is the first server.

10. A machine takeover method according to claim 8, wherein said stand-by server is a third server other than said first and second servers.

11. A machine takeover method according to claim 8, wherein said first queue and said second queue are comprised of an input queue, an output queue, and an input flag.

12. A server takeover system for a communications network, comprising:

a first network node;

a first queue computer including a first network interface card and a first internal queue; and a second queue computer including a second network interface card and a second internal queue, each of said network interface cards being communicatively connected to said first network node, wherein said first queue computer is adapted to perform transaction management by receiving unprocessed transactions directed to said first queue computer from said first network node and storing said unprocessed transactions in said first internal queue until said unprocessed transactions are processed and sending said processed transactions back to said first network node, further wherein said second queue computer receives said unprocessed transactions directed to said first computer and stores said unprocessed transactions in said second internal queue, and further wherein said second queue computer is adapted to takeover the transaction management for said first computer when said first queue computer enters a failure state.

13. The system of claim 12, wherein said transaction management takeover is transparent to devices connected to said first network node, and further wherein said devices address transactions to said first queue computer after said transaction management takeover.

14. The system of claim 12, wherein said second queue computer further comprises a second information buffer and a packet sniffing module connected to the second network interface card and second connection information buffer, wherein said packet sniffing module filters all network transactions received at the second network interface card using the information stored in the second connection information buffer to determine said unprocessed transactions directed to said first queue computer, and further wherein an output of said packet sniffing module is connected to said second internal queue and said unprocessed transactions directed to said first queue computer are stored in said second internal queue.

15. The system of claim 14, wherein said second queue computer further comprises
- a second guardian block capable of detecting a failure state in the first queue computer and
- a packet spoofing module connected to the second connection information buffer and the second internal queue, wherein said packet spoofing module is adapted to spoof packets stored in the second internal queue in the event that the second guardian block detects that said first queue computer has entered a failure state.

16. The system of claim 15, further comprising:
- a second network node on a different network layer than said first network node,
- wherein said first queue computer further comprises a third network interface card and a third connection information buffer connected to said third network interface card, and said second queue computer further comprises a fourth network interface card and a fourth connection information buffer connected to said fourth network interface card,
- wherein said third and fourth network interface cards are connected to said second network node, and
- further wherein said first network node is part of an upper client level of said network and said second network node is part of a lower application server level of said network.

17. The system of claim 16, further comprising:
- a third queue computer including a fifth network interface card and a third internal queue, said third network interface card being communicatively connected to said network node,
- wherein said third queue computer receives said unprocessed transactions directed to said first computer and stores said unprocessed transactions in said third internal queue.

18. The system of claim 12, wherein said first queue computer further comprises a first application server and said second queue computer further comprises a second application server.

19. A takeover method for a communications system including an upper and a lower network layers and first and second queue computers connected in parallel between the upper and lower layers, said takeover method comprising the steps of:
- receiving, at the first queue computer, an INPUT transaction addressed to said first queue computer from the upper network layer;
- en-queuing said INPUT transaction into a first queue in said first queue computer;
- en-queuing said INPUT transaction into a second queue in said second queue computer;
- sending, from said first queue computer, the INPUT transaction to the lower network layer; and
- setting an input flag in said second queue corresponding to said stored INPUT transaction in response to said sending operation.

20. The method of claim 19, further comprising the steps of:
- receiving, at the first queue computer, an OUTPUT transaction addressed to said first queue computer from the lower network layer that is responsive to said INPUT transaction;
- en-queuing said OUTPUT transaction into said first queue; and
- en-queuing said OUTPUT transaction into said second queue.

21. The method of claim 20, further comprising the steps of:
- sending, from said first queue computer, the OUTPUT transaction to the upper network layer; and
- removing said OUTPUT transaction, said related INPUT transaction, and said corresponding input flag from said second queue in response to said sending of the OUTPUT transaction.

22. The method of claim 19, wherein said first and second queues include an input queue, an output queue, and an input flag, wherein
- said input queues include INPUT transactions from the upper level addressed to the first queue computer that have been received by the first queue computer and
- said output queues include OUTPUT transactions from the lower level addressed to the first queue computer that are responsive to one of said received INPUT transactions and that are received by the first queue computer, and
- said input flags are set when said received INPUT transactions are sent out to the lower network layer.

23. The method of claim 22, further comprising the steps of:
- monitoring the status of the first queue computer by the second queue computer to determine if the first queue computer is in a failure state; and
- performing, by the second computer, transaction communication management on behalf of said first queue computer while said first queue computer is in said failure state.

24. The method of claim 23, wherein said transaction communication management includes a step of sending, by the second queue computer, all OUTPUT transactions stored in the output queue of the second queue to said upper network layer.

25. The method of claim 23, wherein said transaction communication management includes a step of sending, by the second queue computer, all INPUT transactions stored in the input queue of the second queue that do not have a corresponding input flag set.

26. The method of claim 23, wherein said transaction communications management includes the steps of:
- receiving, at the second queue computer, additional INPUT transactions addressed to said first queue computer from the upper network layer; and
- spoofing these additional INPUT transactions to the lower layer using address information about the first queue computer.

27. The method of claim 23, wherein said transaction communications management includes the steps of:
- receiving, at the second queue computer, additional OUTPUT transactions addressed to said first queue computer from the lower network layer; and
- spoofing these additional OUTPUT transactions to the upper layer using address information about the first queue computer.

* * * * *